(12) United States Patent
Spitzer et al.

(10) Patent No.: US 6,879,443 B2
(45) Date of Patent: Apr. 12, 2005

(54) BINOCULAR VIEWING SYSTEM

(75) Inventors: Mark B. Spitzer, Sharon, MA (US);
Gregory H. Hunter, Dover, MA (US);
Paul M. Zavracky, Norwood, MA (US)

(73) Assignee: The Microoptical Corporation, Westwood, MA (US)

( * ) Notice: Subject to any disclaimer, the term of this patent is extended or adjusted under 35 U.S.C. 154(b) by 30 days.

(21) Appl. No.: 10/656,905

(22) Filed: Sep. 5, 2003

(65) Prior Publication Data

US 2004/0212776 A1 Oct. 28, 2004

Related U.S. Application Data

(60) Provisional application No. 60/465,441, filed on Apr. 25, 2003.

(51) Int. Cl.⁷ .............................................. G02B 27/14
(52) U.S. Cl. ......................................... 359/630; 345/8
(58) Field of Search ................................ 359/630, 631, 359/633; 345/7, 8; 351/158, 41

(56) References Cited

U.S. PATENT DOCUMENTS

| | | | |
|---|---|---|---|
| 4,704,000 A | 11/1987 | Pekar et al. ................. | 350/145 |
| 4,729,648 A | 3/1988 | Armstrong ................... | 350/578 |
| 4,884,137 A | 11/1989 | Hanson et al. .............. | 358/108 |
| 4,961,626 A | 10/1990 | Fournier et al. ............. | 350/174 |
| 5,003,300 A | 3/1991 | Wells .......................... | 340/705 |
| 5,106,179 A | 4/1992 | Kamaya et al. ............. | 351/158 |
| 5,129,716 A | 7/1992 | Holakovszky et al. ........ | 351/50 |
| 5,281,957 A | 1/1994 | Schoolman .................... | 345/8 |
| 5,334,991 A | 8/1994 | Wells et al. .................... | 345/8 |
| 5,384,654 A | 1/1995 | Iba .............................. | 359/364 |
| 5,446,507 A | 8/1995 | Chang ......................... | 351/158 |
| 5,585,871 A | 12/1996 | Linden ........................ | 351/158 |
| 5,671,037 A | 9/1997 | Ogasawara et al. ......... | 351/158 |
| 5,682,173 A | 10/1997 | Holakovszky et al. ......... | 345/8 |
| 5,712,649 A | 1/1998 | Tosaki ............................ | 345/8 |
| 5,719,588 A | 2/1998 | Johnson ......................... | 345/8 |
| 5,751,493 A | 5/1998 | Hur .............................. | 359/630 |
| 5,815,126 A | 9/1998 | Fan et al. ....................... | 345/8 |
| 5,886,822 A | 3/1999 | Spitzer ........................ | 359/630 |
| 6,023,372 A | 2/2000 | Spitzer et al. .............. | 359/630 |
| 6,081,304 A | 6/2000 | Kuriyama et al. .......... | 348/838 |
| 6,091,546 A | 7/2000 | Spitzer ........................ | 359/618 |
| 6,204,974 B1 | 3/2001 | Spitzer ........................ | 359/630 |
| 6,349,001 B1 | 2/2002 | Spitzer ........................ | 359/618 |
| 6,353,503 B1 | 3/2002 | Spitzer et al. .............. | 359/630 |
| 6,356,392 B1 | 3/2002 | Spitzer ........................ | 359/630 |
| 6,384,982 B1 | 5/2002 | Spitzer ........................ | 359/630 |
| 6,683,584 B2 * | 1/2004 | Ronzani et al. ................. | 345/8 |
| 2003/0165017 A1 | 9/2003 | Amitai ........................ | 359/636 |

FOREIGN PATENT DOCUMENTS

| | | |
|---|---|---|
| DE | 36 23 206 A | 1/1988 |
| EP | 0 825 470 A | 2/1998 |
| WO | WO 95 11473 A | 4/1995 |
| WO | WO 99 23524 | 5/1999 |

\* cited by examiner

*Primary Examiner*—Hung Xuan Dang
(74) *Attorney, Agent, or Firm*—Weingarten, Schurgin, Gagnebin & Lebovici LLP

(57) ABSTRACT

A binocular viewing system provides images from electronic display elements to the left and right eyes of a user transmitted via right eye and left eye display assemblies connected by a nose bridging element. The binocular viewing system includes an interpupillary distance adjustment mechanism to accommodate multiple users. Accommodation for vision correction and a focus mechanism may also be provided. Also, the binocular viewing system provides a virtual image at a distance less than infinity, in an arrangement that also accommodates a range of interpupillary distances. In other aspects, the binocular viewing system incorporates face curvature to more comfortably fit a user's head, and places the electronic display elements close to the user's eye, either in the line of sight, or within the nose bridging element.

75 Claims, 19 Drawing Sheets

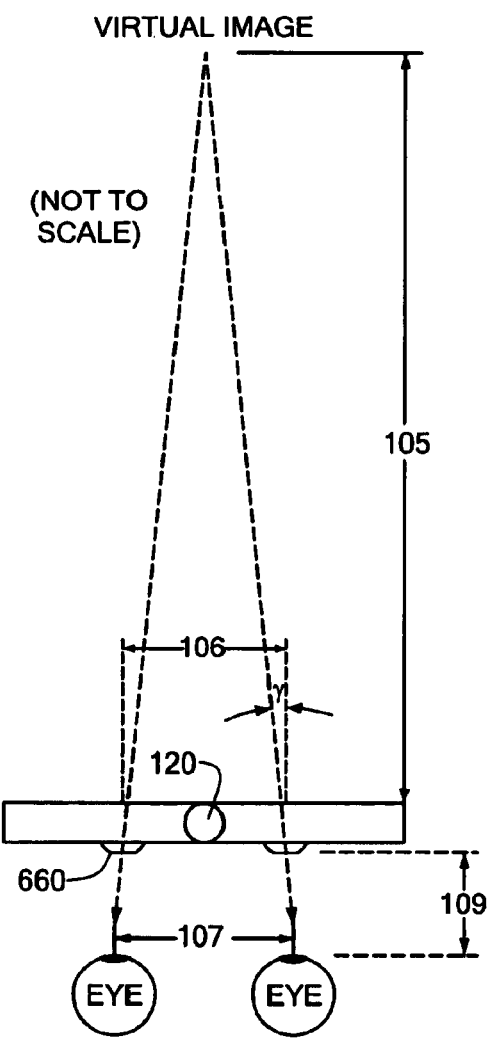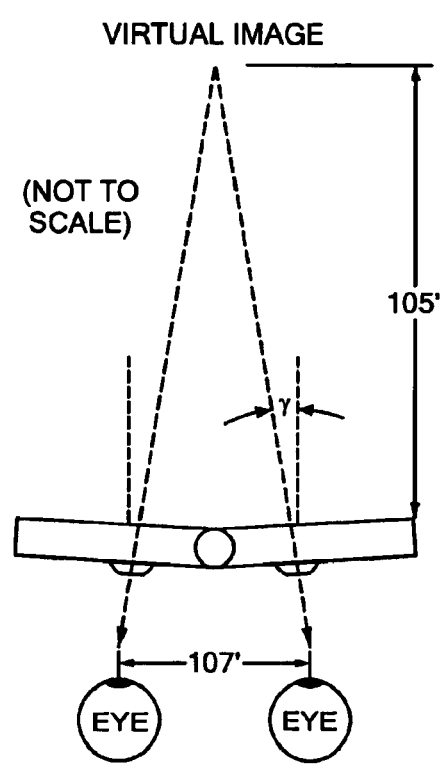
FIG. 16A
FIG. 16B

BINOCULAR VIEWING SYSTEM

CROSS REFERENCE TO RELATED APPLICATIONS

This application claims the benefit under 35 U.S.C. § 119(e) of U.S. Provisional Patent Application No. 60/465,441, filed on Apr. 25, 2003, the disclosure of which is incorporated by reference herein.

STATEMENT REGARDING FEDERALLY SPONSORED RESEARCH OR DEVELOPMENT

N/A

BACKGROUND OF THE INVENTION

The present invention relates to the field of binocular viewing systems.

Information storage and processing, electronic recording of sound and images, electronic communications, and electronic entertainment systems have become widespread, and portable applications of these technologies are growing rapidly. Monocular optical viewing systems integrated into or attachable to eyeglasses have been described. See, for example, U.S. Pat. No. 5,886,822. It is also known to form two monocular viewers into binocular viewers. For example, a binocular eyewear display is illustrated in FIG. 21 of U.S. Pat. No. 6,349,001 B1 and FIG. 21 of U.S. Pat. No. 6,091,546. In these approaches to forming binocular viewers, the details of the nose bridge connecting the two halves have not been taught.

Generally, optical components of binocular viewing systems have been attached to a frame structure that extends across the face and in front of the user's eyes. U.S. Pat. No. 5,129,716 is an example of a stereoscopic wearable display appliance which utilizes a transparent frame that extends across the face and in front of the eyes, but the frame performs no optical functions in transmitting light from the image displays to the eyes. Instead, optical components in an optical train from the image displays are provided separately from the frame, the frame being present to mount and support the optical components.

SUMMARY OF THE INVENTION

The present invention relates to binocular viewing systems that increase user comfort and usability, particularly for applications such as DVD and other video viewing during which the user will wear the unit for extended periods of time. These objects are addressed by providing a binocular viewing system in which the optical components are self-supporting and do not need to be attached to a frame in front of the face. Temple pieces at the sides support the binocular viewing system on a user's ears. The binocular viewing system also accounts for differences in the interpupillary distance between various users. Adjustment of the location of a virtual image at a comfortable distance less than optical infinity can also be provided. The binocular viewing system can also provide a focus adjustment and vision correction for a user with imperfect vision.

In one embodiment, the binocular viewing system of the present invention provides left eye and right eye displays that are connected through a nose bridge. Each display is adjustable, for example, by providing an optical pipe element that is slidable with respect to the nose bridge, which allows adjustment for a variety of interpupillary distances. The binocular viewing system can be manufactured at a reduced cost and reduced weight.

In another embodiment, the binocular viewing system of the present invention can accommodate users having a range of interpupillary distances by fixing the location of the virtual image seen by the user at a distance less than infinity. In one embodiment, the optical axis of each eye's display assembly is arranged to move the virtual image toward the center. In another embodiment, a pivot point is provided in the nose bridging element.

In other aspects of the invention, the binocular viewing system incorporates face curvature to more comfortably fit a user's head, and places the electronic display elements close to the user's eye, either in the line of sight, or within the nose bridging element.

DESCRIPTION OF THE DRAWINGS

The invention will be more fully understood from the following detailed description taken in conjunction with the accompanying drawings in which:

FIGS. 16A and 16B are schematic illustrations of a further embodiment of a binocular viewing system having a pivotable interpupillary adjustment mechanism;

DETAILED DESCRIPTION OF THE INVENTION

Figure 1:
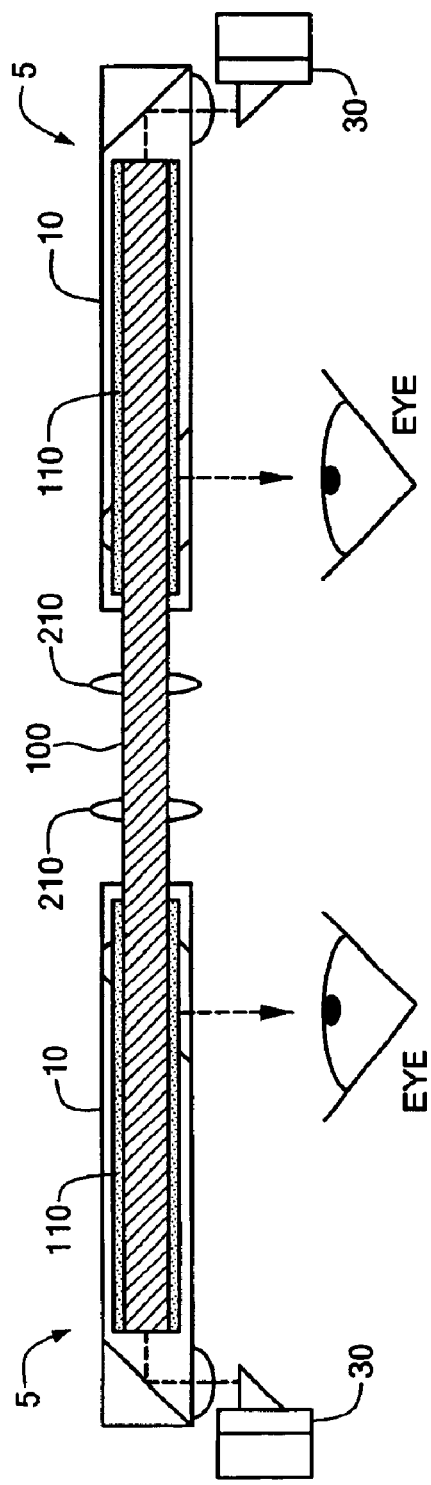
FIG. 1 is a schematic top view of a binocular viewing system according to the present invention.

FIG. 1 illustrates a first embodiment of a binocular viewing system according to the present invention. The binocular viewing system is provided with a pair of display assemblies 5, one for the right eye and one for the left eye. Each display assembly includes an electronic display element 30, such as an LCD or other device as known in the art. Each display element also includes a clear optical pipe element 10. One optical pipe element includes optical components, including an eyepiece assembly, to transmit an image from the display element to a user's right eye, and the other optical pipe element includes optical components, including an eyepiece assembly, to transmit an image from the display element to the user's left eye. For example, referring to FIG. 2, in a see-around approach, a turning mirror 20 and eyelens 30 form an eyepiece assembly supported by a clear mechanical pipe 10 that transmits light from a display 30 to the eye, indicated by ray 35. As another example, in a see-through approach, illustrated in FIG. 3, the rays 35 from a display 30 are relayed through the pipe 10 to a polarization beam splitter 45 to a focusing mirror 60 and back through the beam splitter. Having passed twice through a quarter wave plate 46, the light is therefore reflected by the beam splitter 45 and relayed to the eye.

The binocular viewing system is adjustable to fit a wide range of people. More particularly, the viewing system has an adjustment mechanism for adjusting the interpupillary distance (IPD). The IPD is the distance between the user's pupils, which must approximately align with the distance between the pupils of the eyepiece assemblies of the viewing system.

Binocular systems require that the optical subsystems delivering images to the left and right eyes be aligned to a tight tolerance. Vertical displacement must be less than 30 microns in the object plane, and angular separation of the central rays for the left and right eyes should be less than 5 min. of arc in the vertical axis. The IPD adjustment mechanism of the present system is able to maintain this alignment.

The IPD adjustment mechanism of the present invention includes a nose bridging element that remains centered over the user's nose. The right and left display assemblies are movably mounted to the nose bridging element. The right and left display assemblies and the nose-bridging element are self-supporting across the user's face and do not need to be attached to a frame in front of the face for this purpose. Temple pieces are provided at the opposite ends of the right and left display assemblies to support the binocular viewing system on the user's ears. A frame may be provided in addition to mount corrective lenses, described further below.

Figure 4A:
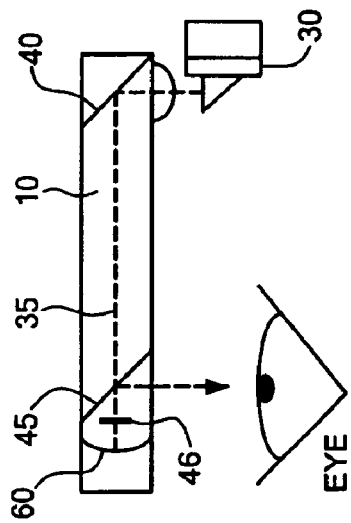
FIG. 4A is a side view of the binocular viewing system of FIG. 3.
Figure 4A:
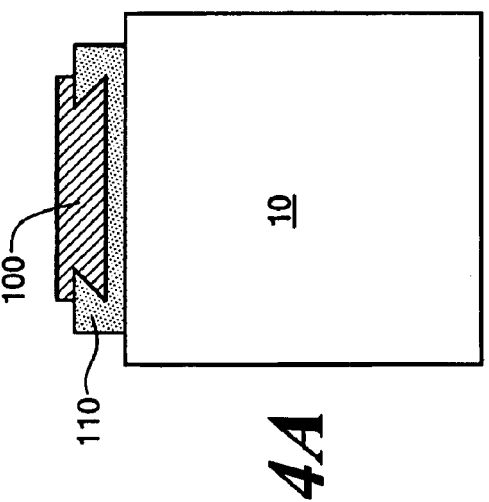
Figure 4B:
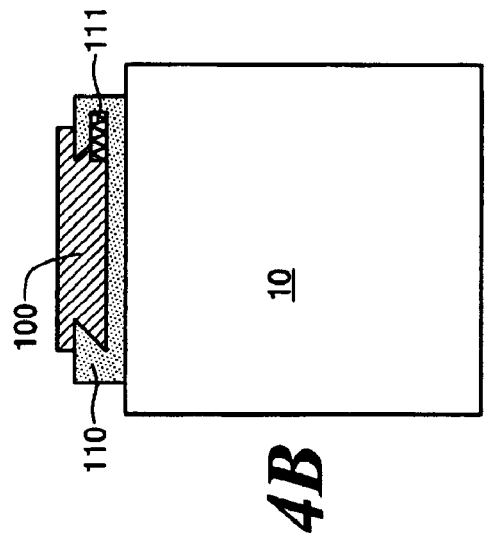
FIG. 4B is a side view of the binocular viewing system of FIG. 3 incorporating a spring loading in the channel.
Figure 5:
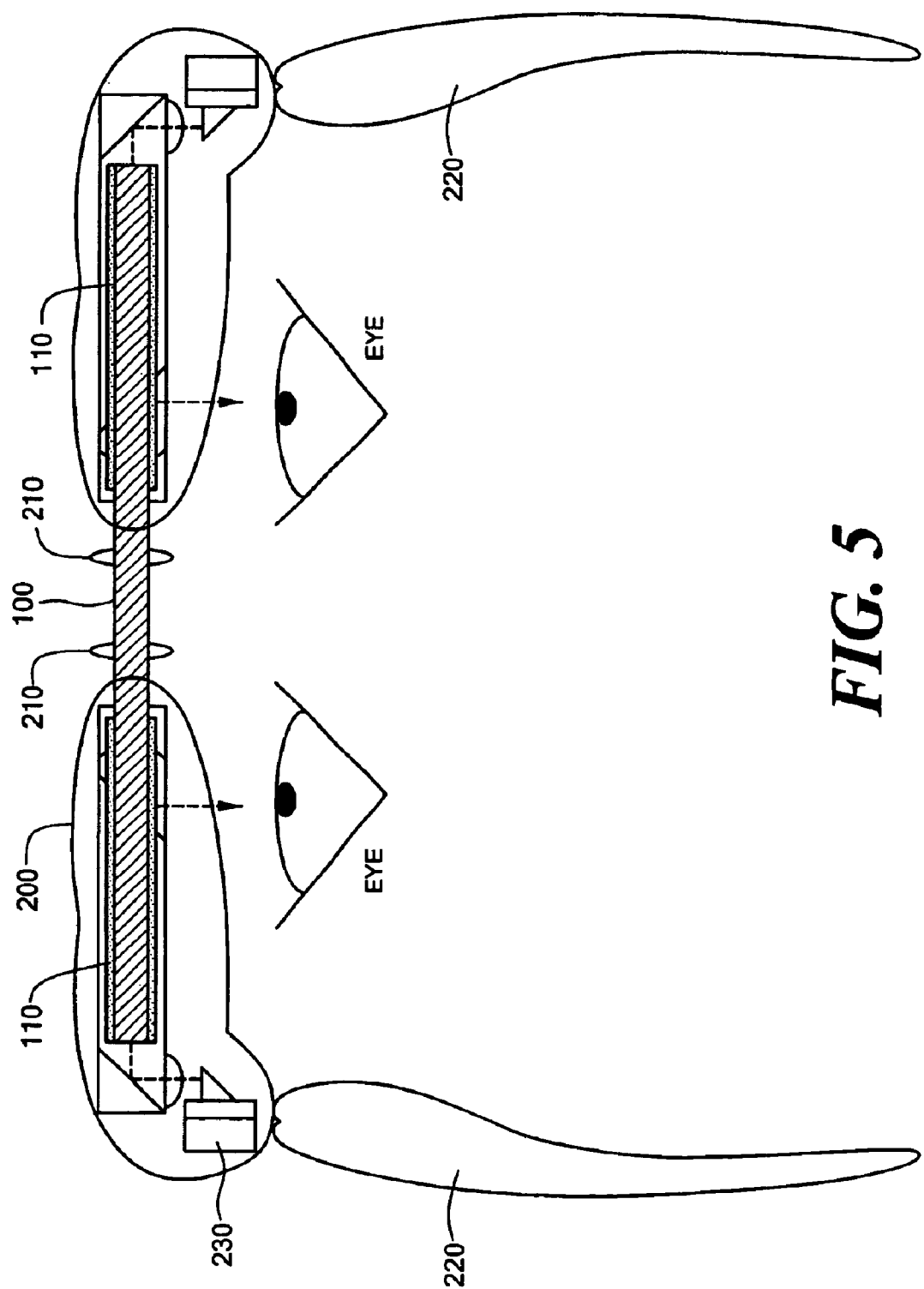
FIG. 5 schematically illustrates the binocular viewing system of FIG. 3 mounted in a housing.

Referring more particularly to FIGS. 1, 4A, and 5, a preferred embodiment in an IPD adjustment mechanism includes a joining rail 100 that bridges the nose. Rails 110 are mounted to the clear plastic optical pipes along the top (or bottom) surface of the pipes. The rails 110 include a channel, such as a dovetail or other chamfer, that interlocks with the joining rail 100, as shown in the cross sectional diagram in FIG. 4. The optical pipes are thus free to move horizontally but cannot rotate.

In an alternative embodiment, the joint may be spring loaded or otherwise biased to force the chamfered edges together along one side to take manufacturing tolerances into account. In the embodiment illustrated in FIG. 4B, a spring 111 forces the joining rail against one side of the dovetailed channel, to minimize rotations that could result if the dovetail slot in the rail 110 were slightly larger than the joining rail 100. A wound compression spring is shown in FIG. 4B; it will be appreciated that multiple springs and other types of springs, such as leaf springs, can be used to force the joining rail against the channel surface.

Note that these rail embodiments may also be provided with a curved channel, with the optical pipe provided with a matching curve, so that as the IPD is adjusted by motion along the rail, the optical convergence angle (γ in FIG. 15) is slightly changed. This has the benefit of better matching the convergence distance and the focal plane distance over a range of IPDs, so as to minimize the disparity in these two distances.

Nose pieces 210 are attached to the rail 100. (See FIGS. 1 and 5.) The nose pieces ensure that the rail remains centered over the user's nose while the right and left display assemblies are free to slide along the rail, thereby allowing adjustment of the IPD.

Pipe 10 and rail 110 may be formed as separate pieces that are joined by gluing or welding, or may be formed integrally; for example, if the optical pipe is injection molded, the rails can be formed as part of the material in the molding process. Alternatively, the necessary chamfer can be machined into the pipe. Any suitable material can be used, such as a plastic suitable for optical use, as would be known in the art.

Note also that the sliding axis may not necessarily be aligned to the optical axis. The optical axis may have a tilt so that the eyes perceive a stereo image at a fixed distance. However, the translation of the optical pipes 10, and more specifically the pupils of the optical system, should be perpendicular to the user's line of sight when gazing at a distant object, and should be in the horizontal plane. The alignment rails may be placed either on the top or bottom surface of the optical elements, or on both surfaces.

The present system is an improvement over prior art optical systems in which the pupils are sufficiently large that no adjustment is needed, but that are, however, necessarily large and heavy. The present system provides a more comfortable design by combining an optical system of a smaller, more appropriate, size with IPD adjustment.

The system shown in the foregoing figures may optionally be mounted into a housing 200, as shown in FIG. 5. The housing may have rails or other structures for sliding the mounting of the optical system described previously so that the alignment and adjustment system is integrated in the housing. Temples 220 may attach to the housing. The temples may include audio transducers.

Referring to FIGS. 6A–C, 7, and 8, a binocular viewing system is provided that allows additional correction for a user's imperfect vision. The viewing system is mounted to an eyewear frame that is designed so that lenses may be installed to correct the user's vision. The frame can be designed so that it has an appealing look whether or not the corrective lenses are installed.

Figure 6A:
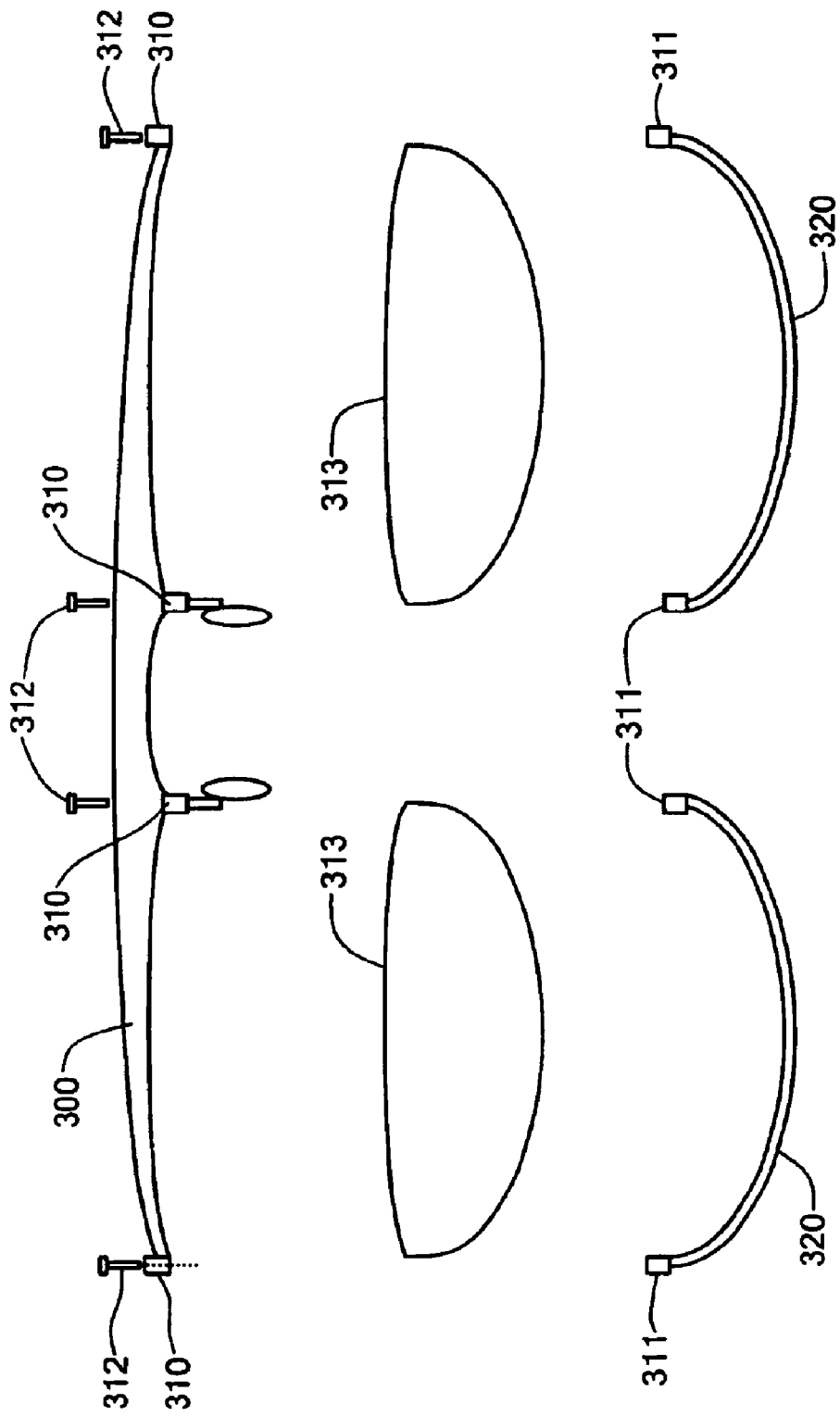
FIG. 6A is an exploded view of an eyewear frame for adding corrective lenses to the binocular viewing system of FIG. 3.
Figure 6B:
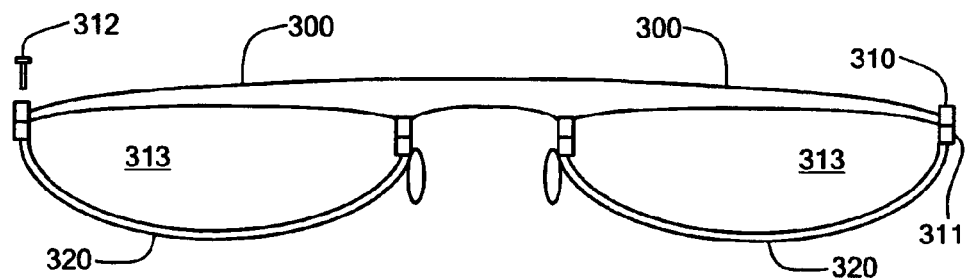
FIG. 6B is an assembled view of the eyewear frame and corrective lenses of FIG. 6A.

FIG. 6A shows a frame 300 that holds eyeglass optics and that is supported by the binocular optics shown in FIGS. 1–5. The frame is provided with a detachable lens retainer 320 that is part of the eye ring when lenses 313 are installed, and not used when lenses are not installed. The frame 300 can be made to look attractive even without lenses 313 and lens retainers 320. The lens retainers 320 (left and right) are attached by small screws 312 at the hinges 310 and at the nose pieces that fit into tapped sections 311 in the lens retainers 320. FIG. 6B shows the eyewear frame with lenses, and FIG. 6C shows a side view with the binocular viewing optics installed.

Figure 7:
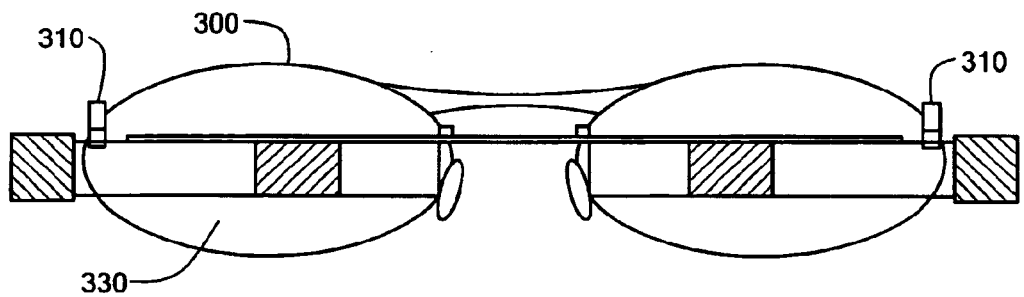
FIG. 7 illustrates the binocular viewing system incorporated with the eyewear frame of FIG. 6.
Figure 8:
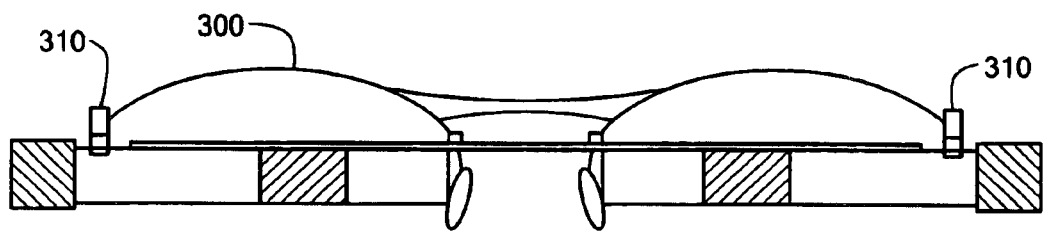
FIG. 8 illustrates the binocular viewing system mounted to an eyewear frame without additional corrective lenses.

FIG. 7 shows the eyewear frame of a different style with corrective lenses and the binocular viewing optics installed. Lenses 330 correct the user's vision. The lenses are mounted in the frame and are consequently between the viewing optics and the user's eyes. FIG. 8 shows the system without corrective lenses. Thus, while the figures show conventional spectacles, the frames may be designed so as to be stylish and attractive with or without lenses. The frames may be made from molded plastics, machined metal, or from other materials and processes known in the art of eyewear frames.

Figure 6C:
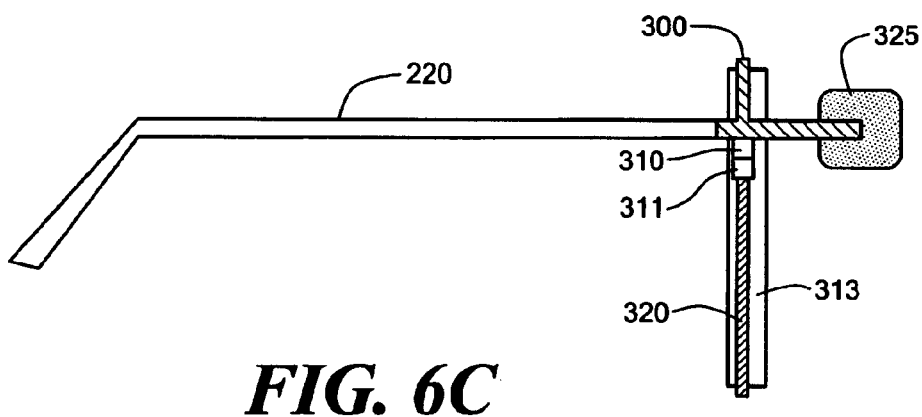
FIG. 6C is a side view of the eyewear frame and corrective lenses illustrating mounting of the binocular viewing system of FIG. 3.

FIG. 6C shows a side view illustrating the attachment of the housings of the optical system 325 to the frame 300. Any number of methods may be used to connect the frame 300 to the optical system, including ball joints or pivoting joints for adjustability, and other methods of attachment, such as mechanical, clamping or magnetic mounts.

The frame 300 may be attached to the optical system 325 at the nose bridging element so that adjustment of the IPD is possible without any restriction of motion that would be imposed by the frame 300. Alternatively, the frame may be provided with a slideable bridge or other adjustments so that the frame 300 can be supported by optical system 325 at the temples without restricting the IPD adjustment of the optical system. The frame 300 and associated corrective eyeglass lenses may also be used with any of the other embodiments that will be described.

Additionally, the left and right lens retainers 320 may be formed as a single lens retainer that holds both lenses, and in which the lenses can be semi-permanently fixed within eye-ring retainers. Such a lens retaining system can mount to the frame 300 in any number of ways, including use of screws as previously described, clamps, magnets or other attachment mechanisms. This feature allows the frame 300 to be used by a number of users, each of whom can install his own spectacle lenses when using the system.

Figure 2:
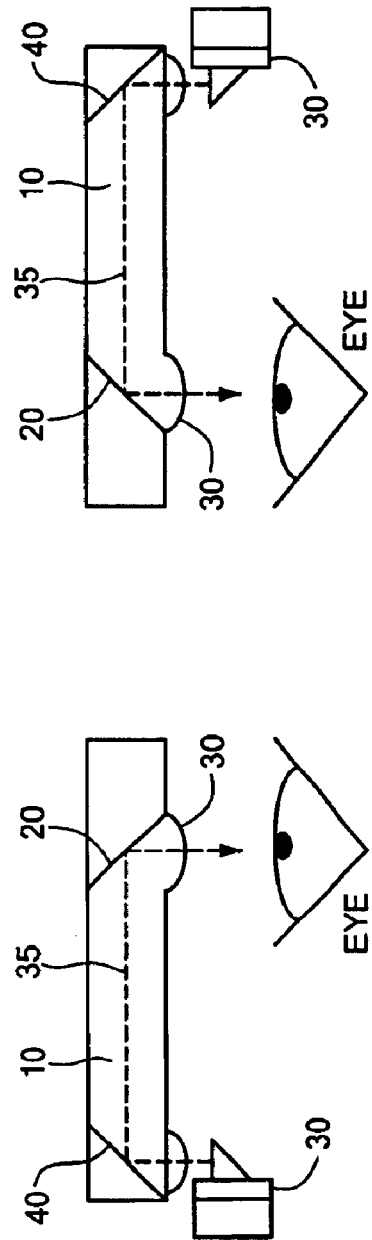
FIG. 2 schematically illustrates see-around optical components for use with the binocular viewing system of FIG. 1.
Figure 3:
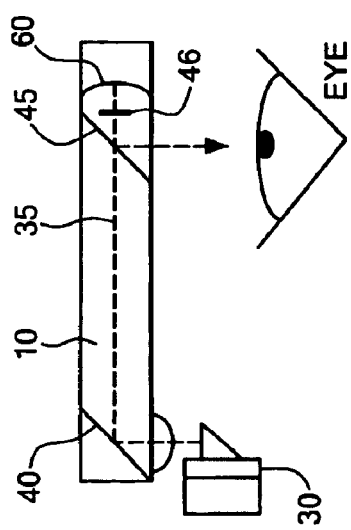
FIG. 3 schematically illustrates see-through optical components for use with the binocular viewing system of FIG. 1.
Figure 9:
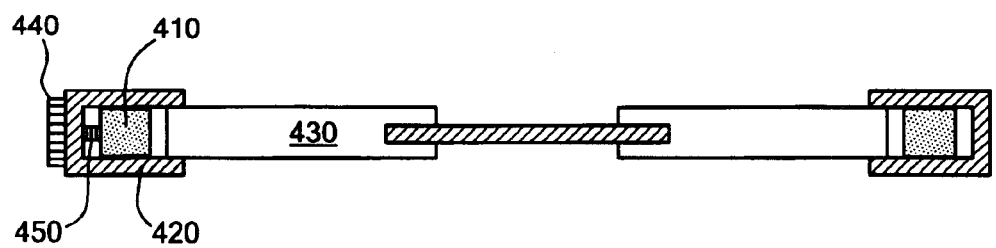
FIG. 9 schematically illustrates a focus adjustment mechanism for use with a binocular viewing system.

A further embodiment for correcting for a user's imperfect vision utilizes a focus adjustment mechanism, illustrated in FIG. 9. This adjustment is obtained optically by moving the display (for example, a liquid crystal display and back illuminator) with respect to the optical system. This has the direct affect of moving the distance of the object plane and therefore the virtual image plane. Focus adjustment can be obtained by creating a mechanical fixture within the housing to allow the user to adjust this distance. The mechanism must move the display without changing the alignment of the displays with respect to each other. For this reason, it may be advantageous to mount the display assembly directly to the end of the optical pipe, without the turning mirror 40 (FIG. 2). FIG. 9 illustrates such a system. The display is mounted in a special carrier 410 within a special housing 420 mounted to the optical pipe 430.

A thumbwheel 440 is connected to the carrier 410 by a leadscrew 450. Rotation of the thumbwheel moves the display carrier. Note that a full focus range, with a virtual image distance adjustable between approximately 25 cm and infinity, is obtained with only a few millimeters of motion of the display carrier.

Figure 10:
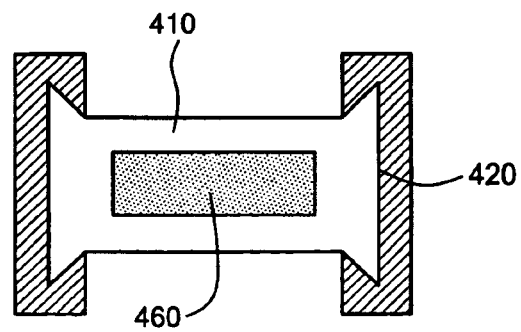
FIG. 10 is a cross-sectional view of the focus adjustment mechanism of FIG. 9.

FIG. 10 shows a cross sectional view of how the display carrier 410 is mounted in the housing that forms an assembly 420. A dove tail or other channel is formed that precisely locates the carrier 410 in the assembly 420, which is rigidly attached to the optical system so as to maintain alignment throughout the focus range. For the case of a liquid crystal display, the housing includes the backlight. The display is glued or otherwise affixed within this housing as a final step in the assembly during the final alignment process.

It is desirable to obtain the lowest possible cost in the manufacture of the binocular viewer system. Low cost can be obtained if the component parts are formed by injection molding and by building into the parts the features needed for alignment, focus adjustment and ease of assembly. The optical pipe may be formed as one part that includes the needed dovetail or rail system for IPD adjustment, as well as an integral eye lens and/or field lens. For viewers that do not utilize IPD adjustment, the left and right optical pipes may be formed in one injection molding operation as one unitary part.

Figure 11A:
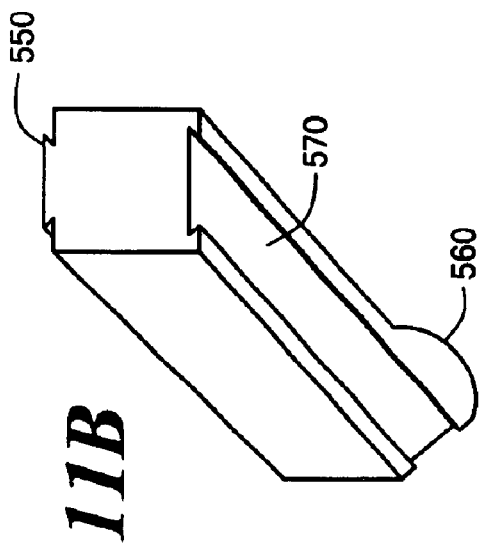
FIG. 11A illustrates an optical pipe for a binocular view system incorporating an integral mounting rail.

An optical pipe with integral rails 550 and an integral eye lens 560 is shown in FIG. 11A. Other features may be added to simplify the assembly of the optical pipe in the required housings. For example, registration features may be added that enable the assembly 420 in FIG. 10 to snap onto the optical pipe with the correct registration. The pipe and housing can then be glued or ultrasonically welded or otherwise affixed to one another.

Figure 11B:
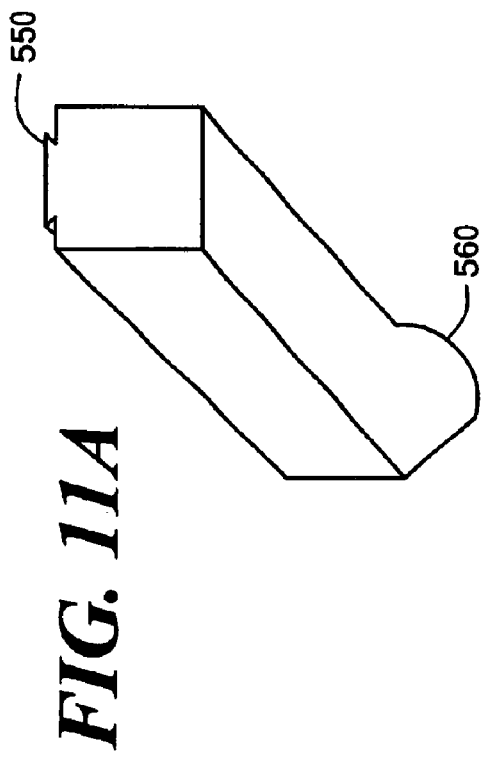
FIG. 11B illustrates an optical pipe for a binocular viewing system incorporating an integral mounting rail and circuitry cavity.

In some designs it may be advantageous to have only one cable to the head. This requires the left and right displays to be connected by wires that are positioned against one side of the optical pipe, preferably the top or bottom side. The wires may comprise a flexible circuit. A shallow cavity 570 can be formed in the injection molding process that will provide space for the flexible circuit or other wiring, as shown in FIG. 11B. Once the flexible circuit is inserted, the cavity can be filled with a matching dovetailed insert of the appropriate thickness.

Figure 12:
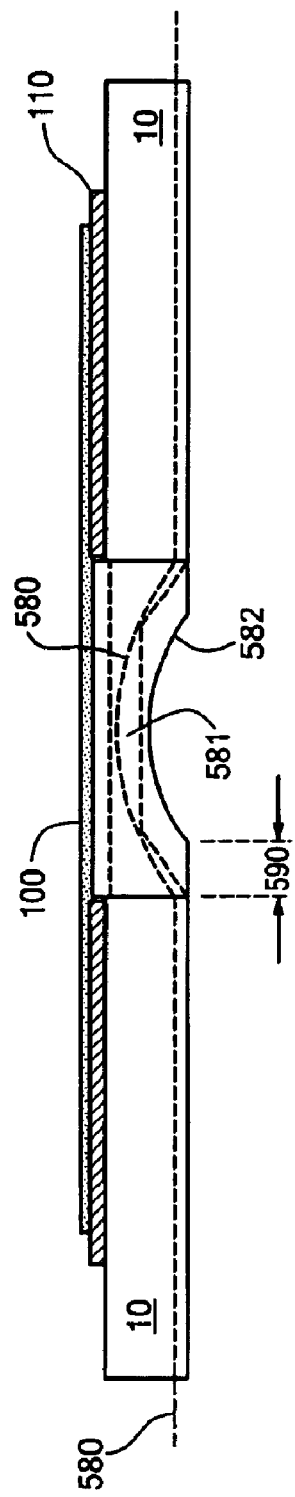
FIG. 12 illustrates a binocular viewing system having a circuitry cavity in a nose bridge.

The flexible circuit or wiring 580 can extend into a cavity 581 in the nose bridge 582. See FIG. 12. A service loop in the flex circuit can be employed to allow the necessary slack in the wiring to permit the pupillary distance to be adjusted by the motion of the pipes 10 using the rails 100 and 110 previously discussed. The cavities in the bridge 582 can be formed to allow the pipes 10 to slide in and out of the bridge, for example, as indicated by the distance 590. The nose bridge 582 itself is bonded to the rail 100 to preserve alignment. The pipes and nose bridge may be made by injection molding to obtain tight tolerances and low manufacturing cost.

Figure 13:
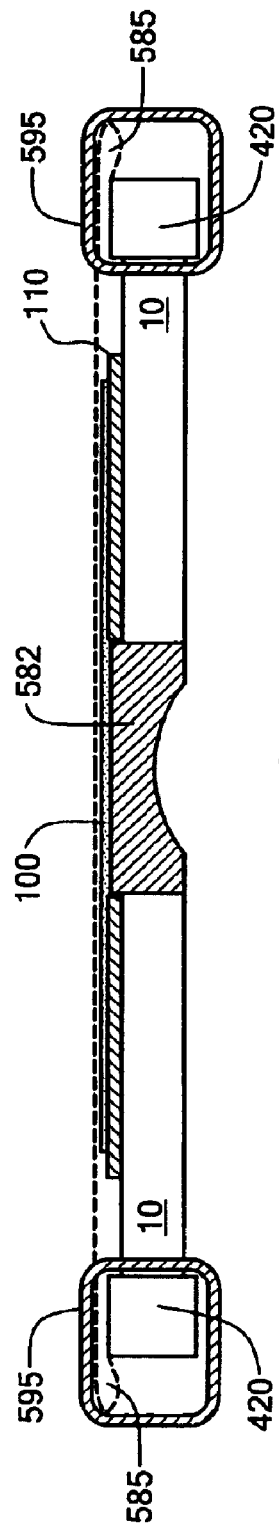
FIG. 13 illustrates a binocular viewing system having service loop cavities in the temples.

As an alternative, service loops 585 may be placed in the right and left temple housing 595 that holds the display assemblies 420, as shown in FIG. 13. In such a case the cable 580 can be fixed to the rail 100. The service loops allow the pipe 10 to move with respect to the bridge 582.

The use of cavities in the nose bridge and elsewhere make possible the reduction of weight of the system. Cavities may also be employed in the optical pipes, provided that the focal length of the lenses are suitably modified.

The electronics may be integrated in the temples 220 shown in FIG. 5. This requires use of a micro liquid crystal display 230, such as the Kopin Cyberdisplay, and a small printed circuit board with video drive circuits and audio circuits. Speakers and microphones can be embedded in the temples 220 by techniques know in the art.

Figure 14:
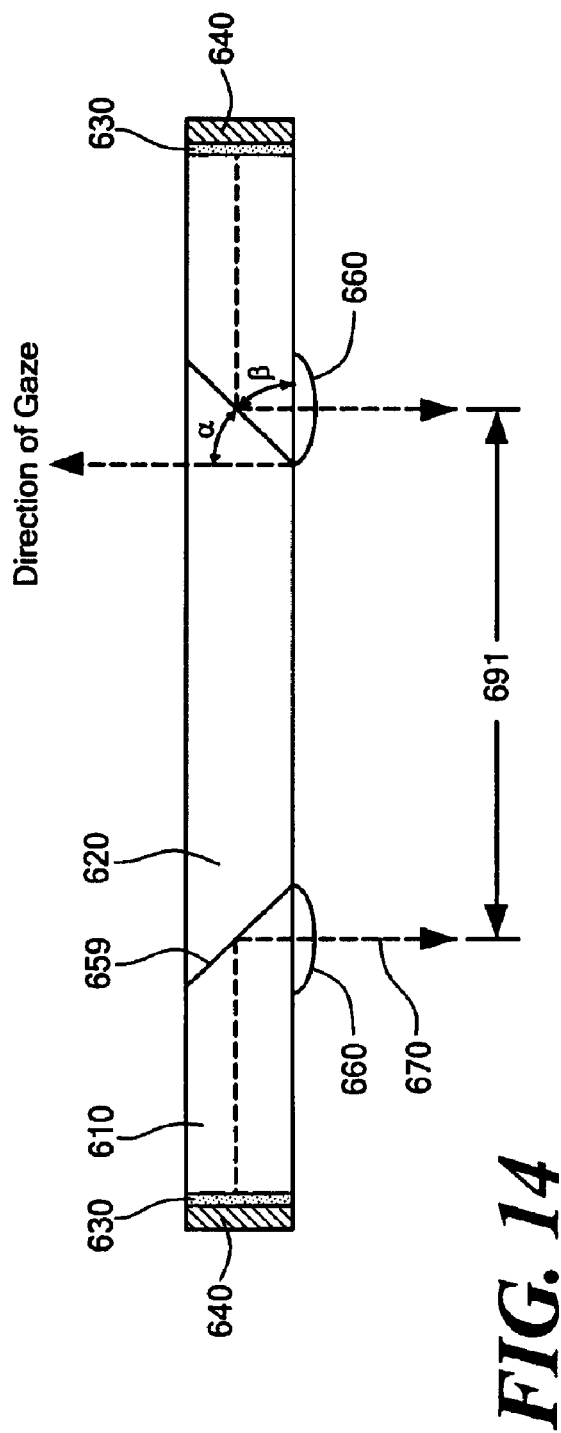
FIG. 14 is a schematic top view of a binocular viewing system viewable by people with a range of interpupillary distances.
Figure 15:
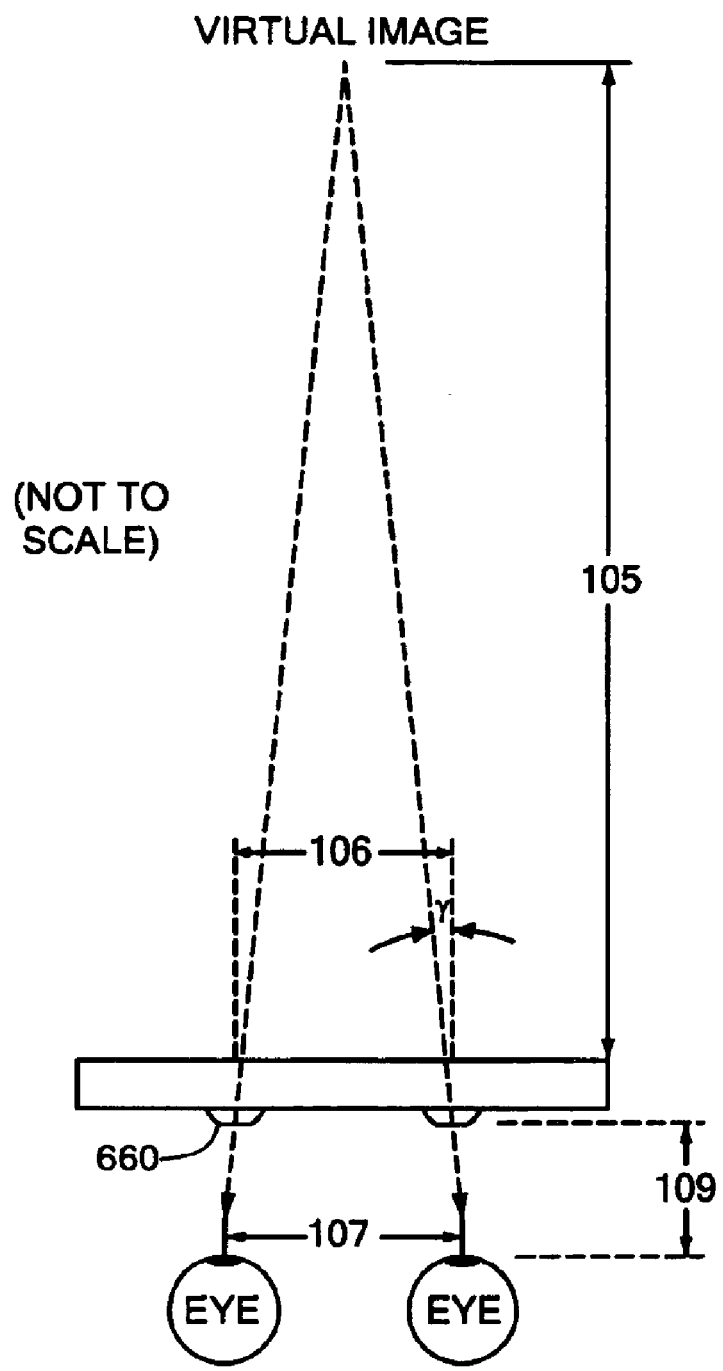
FIG. 15 is a further top view of the binocular viewing system of FIG. 14.

A further binocular system that can be viewed by people with a range of interpupillary distances is illustrated in FIGS. 14 and 15. A display 630, such as a transmissive liquid crystal display, is attached to a clear opto-mechanical pipe 610 and an eyepiece assembly 620 so that light, illustrated by ray 670, is transmitted from a backlight 640 through the display 630 and the optical pipe 610 and is relayed to the eye by assembly 620. The backlight 640 is not needed if the display 630 is self-emitting, such as an organic light emitting diode (oLED) display. A turning mirror 659 is used to reflect light through a lens 660 and then to the eye. The turning mirror may comprise a metal coating, may use total internal reflection, or may use interference coatings known in the art for reflection of selected wavelengths. The lenses 60 may be singlet, doublet, diffractive, holographic or of other nature that modifies the vergence of light and permits the virtual image to be viewed at a comfortable distance.

If the separation distance 691 of the lenses 660 were to correspond to the interpupillary distance (IPD) of the user, the direction of gaze would be straight toward an image that the eyes perceive to be at infinity. In this case, the angles a and β associated with the mirrors are each 45°. The present invention, however, provides an improvement to this system by adjusting the location of the virtual image so that the image is not perceived to be at infinity. This is important in any system in which the user is to be provided with a virtual image at a comfortable viewing distance of between 25 cm and 5 m. In this range, the user perceives distance in several ways, including (among other ways) the judgment of distance by the convergence of the user's gaze (as determined by eye rotation), and by judgment of the focal plane (determined by the position of the muscles that focus the eye). To produce a pleasing image perceived at a certain depth, the eyes should rotate to the approximate angles that would be used to view a real object at that distance. Providing for the convergence of gaze is also important in displays intended for 3-D stereo images.

If the directions of gaze for the user's two eyes are parallel, the virtual image is perceived at infinity. For the case in which the directions of gaze of the two eyes are convergent, as in FIG. 15, a virtual image is created at a distance 105 from the viewer. This modification of the position of the virtual image can be attained simply by moving the virtual image in each eye slightly toward the center. For example, in one embodiment, the displays 630 are moved relative to the optical axis of the eyepiece assembly 620. If the lens 660 offers acceptable off-axis performance, for example, as produced using a suitable aspherical lens design, then the user perceives the image at a distance 105. The focus should be adjusted accordingly, for example, by fixing during assembly or by a mechanism such as described above, so that there is minimal disparity between the focal distance and the convergence distance. The optical separation 106 of the lenses is set to a distance that may be smaller than the user's IPD 107. Consequently, the eyes turn toward the virtual image at an angle ? as shown in FIG. 15. The diameter of the lenses 660 permits the image to be viewed by people with a range of IPD.

The distance 109 may be adjustable to accommodate a range of user IPDs, being made greater for larger IPD, and less for smaller IPD. Thus, adjustable fixtures in the frame for holding the viewer on the head may be used to change the distance 109, allowing the viewing device to be used comfortably by people with different IPD. For example, if the virtual image distance 105 is set to 1 m, and the lens spacing 106 is set to 60 mm, then adjustment of the distance 109 over a range of 25 mm will provide for a range of IPD from 60 mm to 61.5 mm.

FIGS. 16A and 16B show an alternative embodiment in which a pivot point 120 is installed in the bridge of the viewer. In such a case, the angle ? plus the angle introduced at the pivot point add to create a much larger change in the optical axis and hence a large change in the apparent distance 105' to the virtual image. This type of pivot can be used to make the viewing device more suitable for a person with a large IPD 107'.

Figure 17:
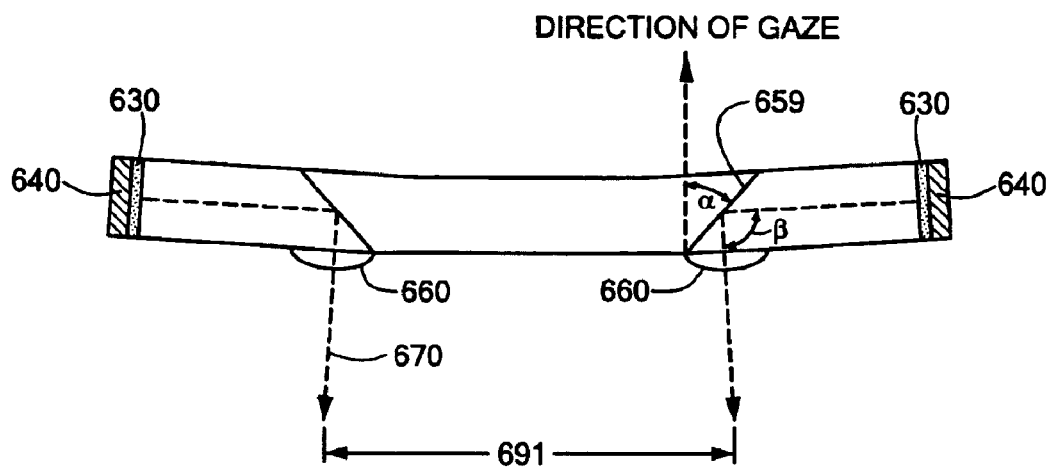
FIG. 17 is a schematic illustration of a still further embodiment of a binocular viewing system viewable by people with a range of interpupillary distances.

A further embodiment combining the inventions shown in FIGS. 15, 16A, and 16B is shown in FIG. 17 to create a system with fixed, converged virtual image that is not at infinity, by using a fixed amount of tilting of the optical axis toward the center. In this case, the tilting is attained by adjusting the angle a of the mirror 659, and the associated optical axis of the eyepiece and display, with respect to the direction of gaze toward a point at infinity. In such a case, the full angle of reflection on the optical axis, β, may remain 90°, but the angle a is less than 45°. This has the effect of tilting the optics while allowing the lens and display to remain nearly, or fully, axial. A further advantage of this design is that the left and right eye virtual images are easily converged at a comfortable viewing distance of between 1 m and 2 m.

Figure 18:
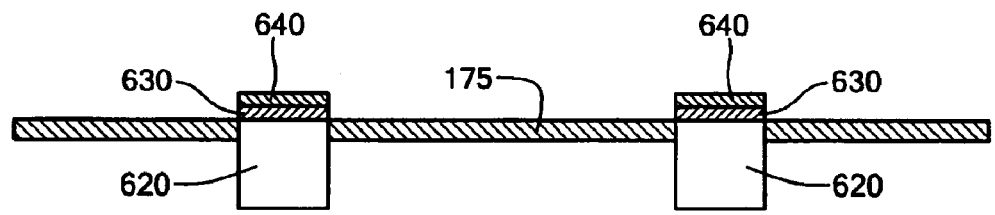
FIG. 18 is a schematic front view of a further embodiment of the binocular viewing system of FIG. 17.
Figure 19:
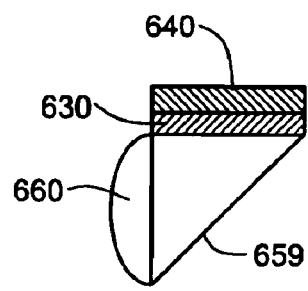
FIG. 19 is a side view of the binocular viewing system of FIG. 18.
Figure 20:
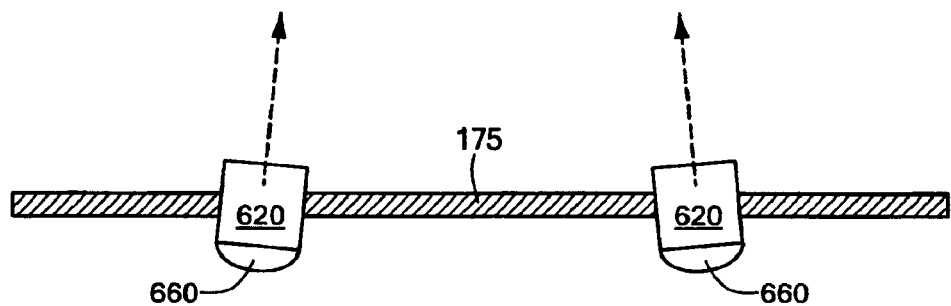
FIG. 20 is a top view of the binocular viewing system of FIG. 18.

The type of optical tilting shown in FIGS. 15, 16A, 16B, and 17 may be applied whether or not the clear optical pipe 610 is used in the optical design. For example, in FIGS. 18 and 19 a simplified eyewear display design is shown using the eyepiece 620, display 630 and backlight 640 without the optical pipe. In this case, the two eye pieces are suspended from a mechanical support 175, which also carries the wiring and IPD adjustment mechanism (if used). FIG. 20 illustrates the top view, which shows the tilt in the optical axis in accordance with the invention in FIGS. 16A and 16B.

Figure 21:
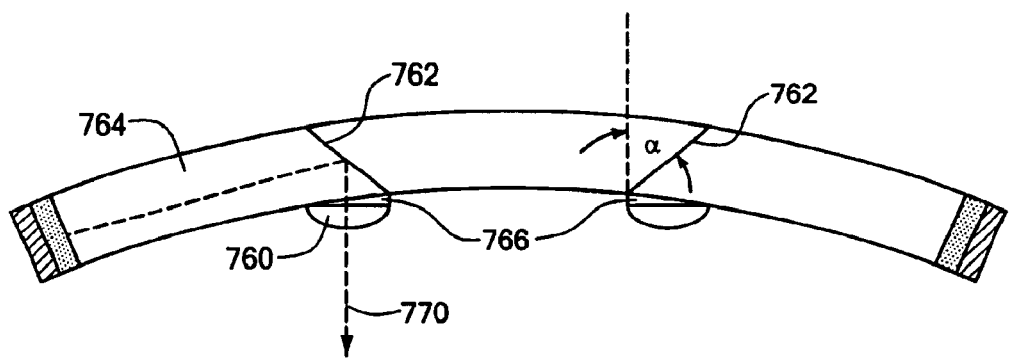
FIG. 21 is a schematic illustration of a binocular viewing system incorporating face curvature.

According to another aspect of the present invention, curvature of the optical system to follow the face (so-called "face curve") can be added by appropriately modifying the optical system. FIG. 21 shows mirrors 762 and lenses 760 inserted within a solid optical pipe 764 so that the rays 770 are propagated axially from the display to the eye. Since the position of the mirrors for face curve is in the opposite direction for convergence, it is useful to introduce an optical wedge 766 behind the lens 760. This maintains the axial nature of the optics and the wedge 766 can be adjusted as needed to insure axial optical alignment between the chief ray 770 and the lens.

Figure 22:
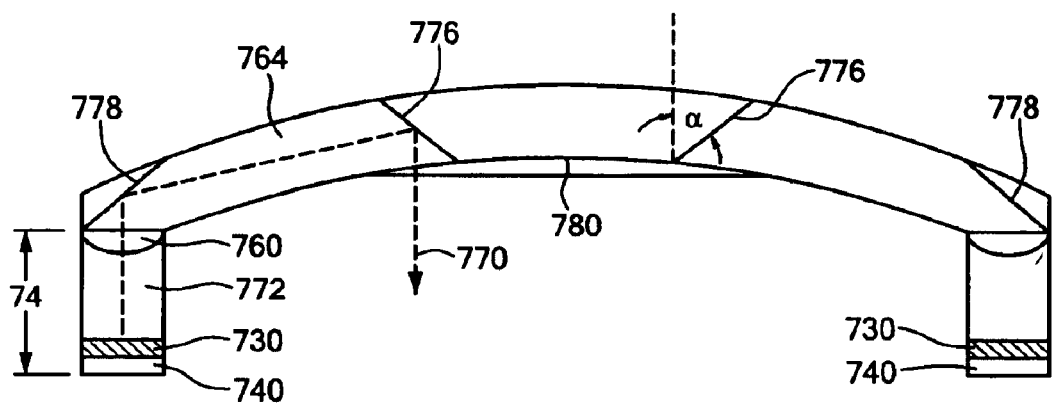
FIG. 22 is a further embodiment of a binocular viewing system incorporating face curvature.
Figure 23:
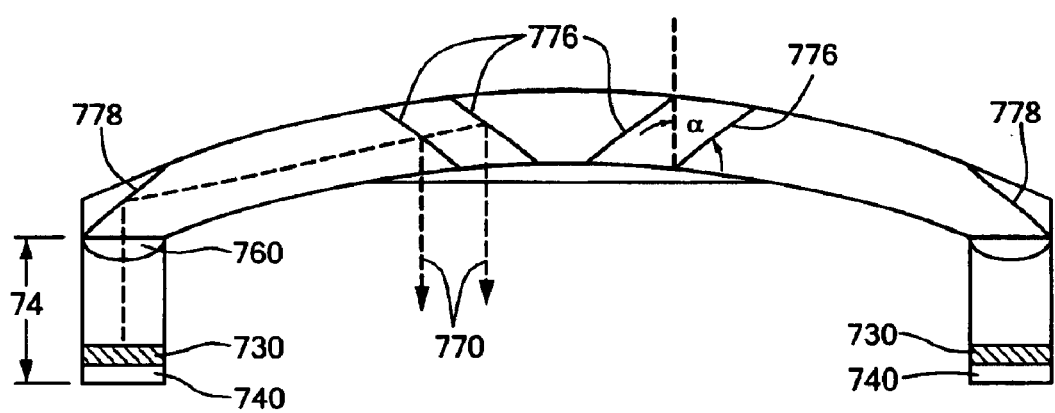
FIG. 23 is a still further view of a binocular viewing system incorporation face curvature and a wide field of view.

Note that the optical pipe need not be solid; it can also be hollow to reduce weight. If the pipe is made hollow, the optical path length is changed. Alternative lenses using different focal length can be employed, or alternative designs can be employed. FIG. 22 illustrates an alternative in which the eye lens 760 is moved to the temple 772. In such a case, the display is placed at a distance 774 approximately equal to the focal length of eyelens 760. The virtual image, which in such a case is distant, is viewed through mirrors 776 and 778. The pipe 764 may be solid or hollow. In such a case, the angle a should be set so that the ray 770 appears to come from infinity and thus is parallel to the direction of gaze. Wedge 780 may be extended fully across the space between the eyes as shown in FIG. 22 or it may be only provided in front of each mirror. If the front surface of the pipe is made relatively flat in front of the eyes, there will be negligible distortion. In this embodiment, a see-through system may be made by partially silvering the mirrors 776 to transmit the desired ratio of display light and ambient light. FIG. 23 shows a further embodiment in which a plurality of mirrors 776 is provided in front of each eye. If the mirrors are partially silvered, ray 770 will be partially reflected at the first mirror 776, and partially transmitted to the second mirror 776. By adjusting the silvering, a uniform transmission of light rays 770 is possible from all of the mirrors 776 meaning that the user has the perception of a wide field of view of the displays 730. Note that alternative coatings may be used including interference coatings, holograms, dichroic coatings and the like, singly or in combination, to create a system with uniform see-through transmission and uniform transmission of rays 770.

Figure 24:
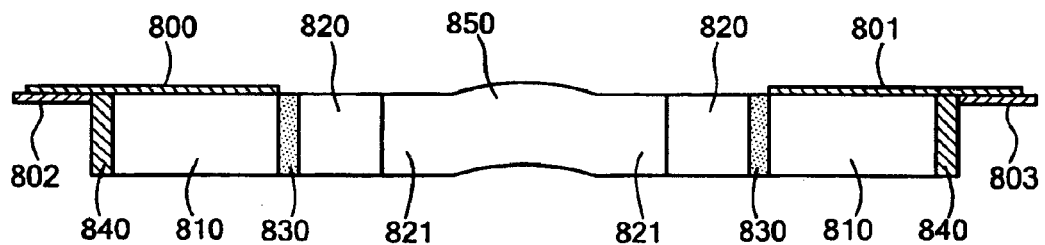
FIG. 24 is a schematic illustration of a further binocular viewing system having a higher magnification.

FIG. 24 shows yet another improvement in the binocular viewer design. In this invention, the LCD 830 is moved close to the lens system 820. Light from the LED 840 is transmitted by the optical pipe 810. By moving the LCD close to the lens assembly, the focal length is shortened, meaning that a higher magnification can be attained. Note that an unpackaged LCD is mainly glass; therefore, if an unpackaged LCD is used, it will not be especially distracting to the user to have it in view near the lens assembly 820. Thus, the user's view of the surroundings is preserved. The interconnection circuitry 800, 801 may be formed from Kapton flexible circuitry and may be laminated to the top of the optical pipe 810 and hidden from view.

Figure 25:
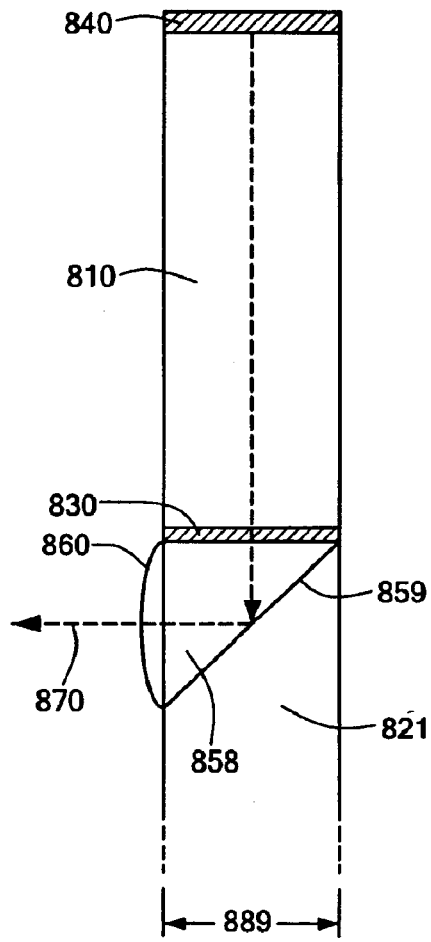
FIG. 25 is a schematic illustration of the optical components of the binocular viewing system of FIG. 24.

The optical design of each lens system 820 is shown in FIG. 25, which shows a top view without the interconnect 800 shown. A central ray 870 propagates from the backlight 840 through the optical pipe 810 to the LCD 830. (Note that if a self-emissive display, such as an oLED, is used, the ray 870 originates at the display 830.) The ray 870 propagates from the display to the mirror 859, whereupon it is reflected to the eyelens 860. From the eyelens, the ray propagates to the eye. If the optical distance from the display 830 to the lens 860 is equal to the focal length of the lens, the image will be perceived at infinity. For the case where the mirror is set at a 45° angle to the display 830, the physical path length will be equal to the width 889 of the pipe. The optical length is then the physical length 889 divided by the index of refraction, n. For example, if the index of refraction of the material 858 between the display and the eyelens is 1.5, and the physical length 889 is 1 cm, then the optical distance is 6.7 mm. This system is therefore capable of attaining a very low f-number and a high magnification. Such systems can benefit from the use of an aspheric doublet or triplet for eyelens 860 to reduce aberrations. Eyelens 860 may also utilize a diffractive element on its surface for further correction of aberrations. If a longer focal length is desired, the material 858 may be air (free space) or the distance between the eyelens 860 and the display 830 may be increased by moving the display toward the backlight 840, or by adding a spacer between the eyelens 860 and the optical material 858. Optical material 858 may comprise the same material as optical pipe 810 or a different material. These materials may include but are not limited to polymethylmethacrylate (PMMA), polycarbonate resin, epoxy resins, urethanes, cyclo-olefin, glass, and other optical materials known in the art.

Figure 26:
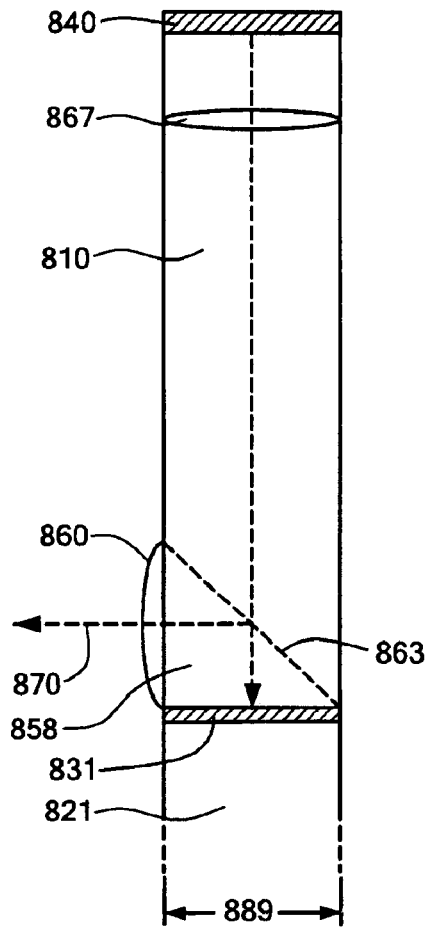
FIG. 26 is a schematic illustration of a further embodiment of the optical components of the binocular viewing system of FIG. 24.

FIG. 26 shows an equivalent design that uses a reflective liquid crystal display, such as fabricated by Displaytech Inc., III-V Corp. and Microdisplay Corp. The optical design considerations are similar to those in FIG. 25; however, for a reflective LCD, the mirror 859 is replaced with a polarization beam splitter 863. The beam splitter 863 passes polarized light to the reflective display 831. The display 831, having rotated the polarization of light impinging on some of the pixels to form an image, reflects light back toward the beam splitter 863 which acts as the analyzer in the viewing system and reflects the light from the desired pixels to the eyelens 860. This system benefits from the long distance between the display 831 and the backlight, which acts to collimate the light and improve the contrast ratio. Optional collimating lenses 867 can also be employed within pipe 810 to further improve the collimation of the illuminating light.

Figure 27:
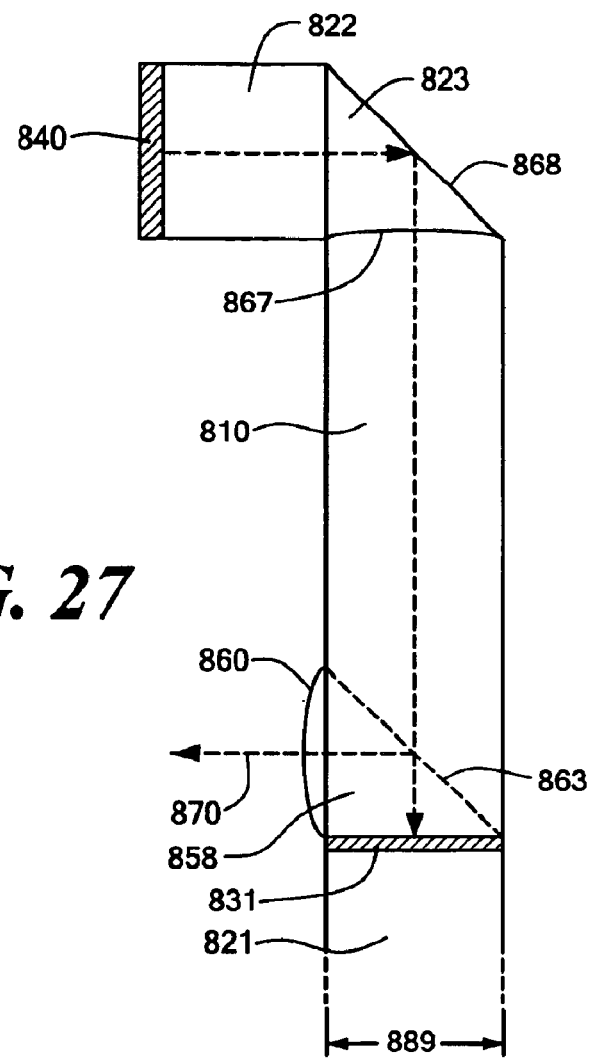
FIG. 27 is a schematic illustration of a still further embodiment of the optical components of the binocular viewing system of FIG. 24.

The collimating lens 867 may also be employed at the entrance to the pipe as shown in FIG. 27. Ideally, the light source 840 is placed at a distance from the lens 867 by employing a further section of optical pipe 822 and a turning mirror 868 so that the system is better configured for wearing on the head. The section 823 as well as the section 822 may comprise optical material or free space. An equivalent system is provided for the other eye.

Figure 28:
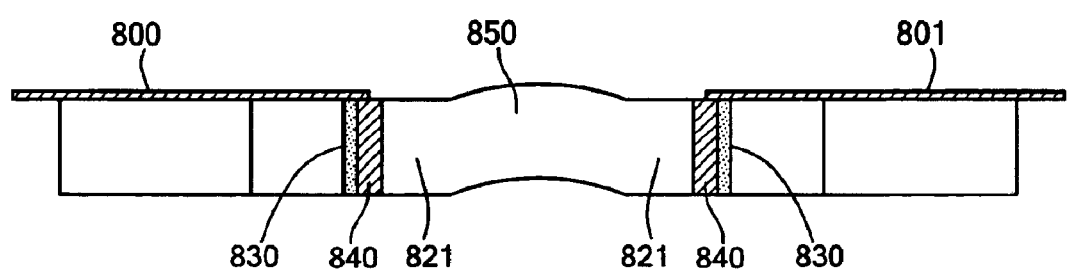
FIG. 28 is a schematic illustration of a further embodiment of a binocular viewing system having high magnification.

The display 830 and backlight 840 can both be moved close to the lens subassembly 820 as shown in FIG. 28. In such a case the display and backlight can be moved toward the nose rather than toward the temple. FIG. 28 shows that the interconnects 800, 801 can be laminated to the optical pipe, as previously described. In this case, the interconnect also may include the power for the backlight 840, which may be integrated within the interconnect 800, or may be a separate lamination. All of the considerations previously described for adding face curvature, or for providing a virtual image at the correct distance, can be employed in this embodiment.

Figure 30:
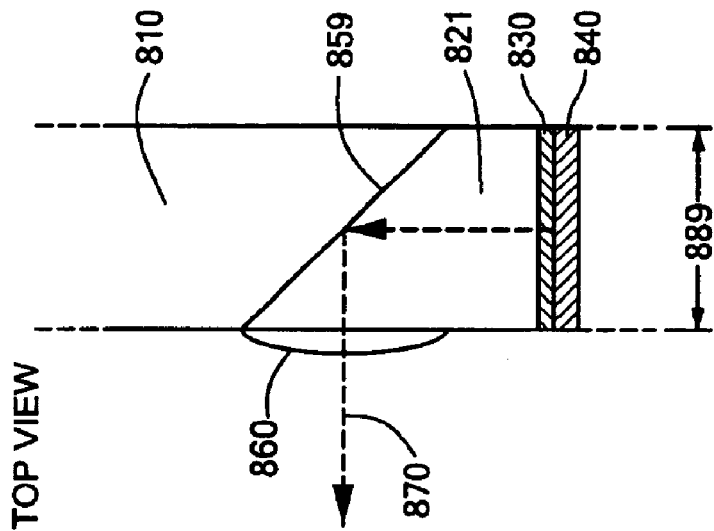
FIG. 30 is a schematic illustration of a further embodiment of the optical components of the binocular viewing system of FIG. 28.
Figure 29:
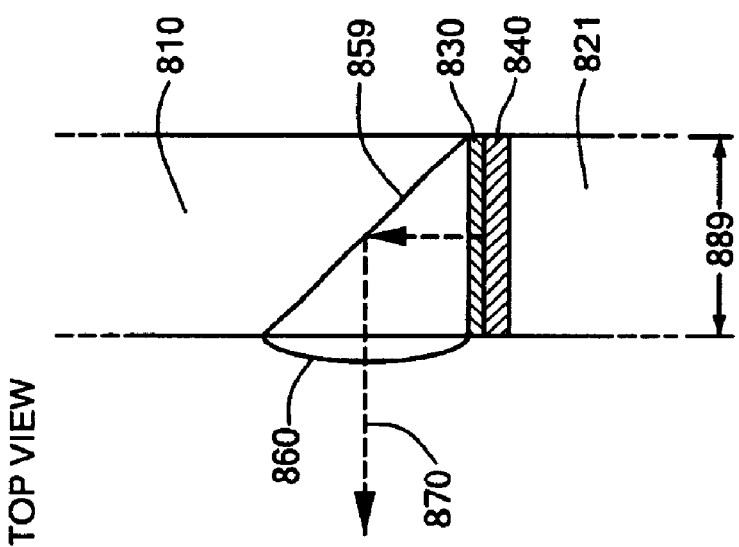
FIG. 29 is a schematic illustration of the optical components of the binocular viewing system of FIG. 28.

FIG. 29 shows the optical design. For the case in which the display 830 comprises a transparent LCD, a thin backlight 840 is provided. If the display 830 is self emissive, no backlight is needed. The optical design considerations are similar to the case described in FIG. 25, except that the LCD is placed toward the nose rather than the temple, and the mirror 859 is reversed. Note also that the pipe 821 may be placed between the backlight 840 and the bridge as shown in FIG. 29, which allows the most magnification, or between the mirror 859 and the display 830 as shown in FIG. 30, which allows the display and backlight to be moved to a location that cannot be seen by the eye and hence offers the least obstruction of vision. Additionally, by placing the display and backlight near the nose where it cannot be seen (FIG. 30), the display and backlight can be covered with a decorative shroud.

In all of the embodiments described, use of an optical material is shown in the optical pipe element and elsewhere. The inventions may also be attained with air or other gas inside the pipe, provided that the user is able to see through the flat sides of the pipe. In some cases the lowest weight and cost will be attained by removing the optical material. For example, the display system in FIG. 28 can be made lightest in weight by using a hollow optical pipe 810.

Figure 31:
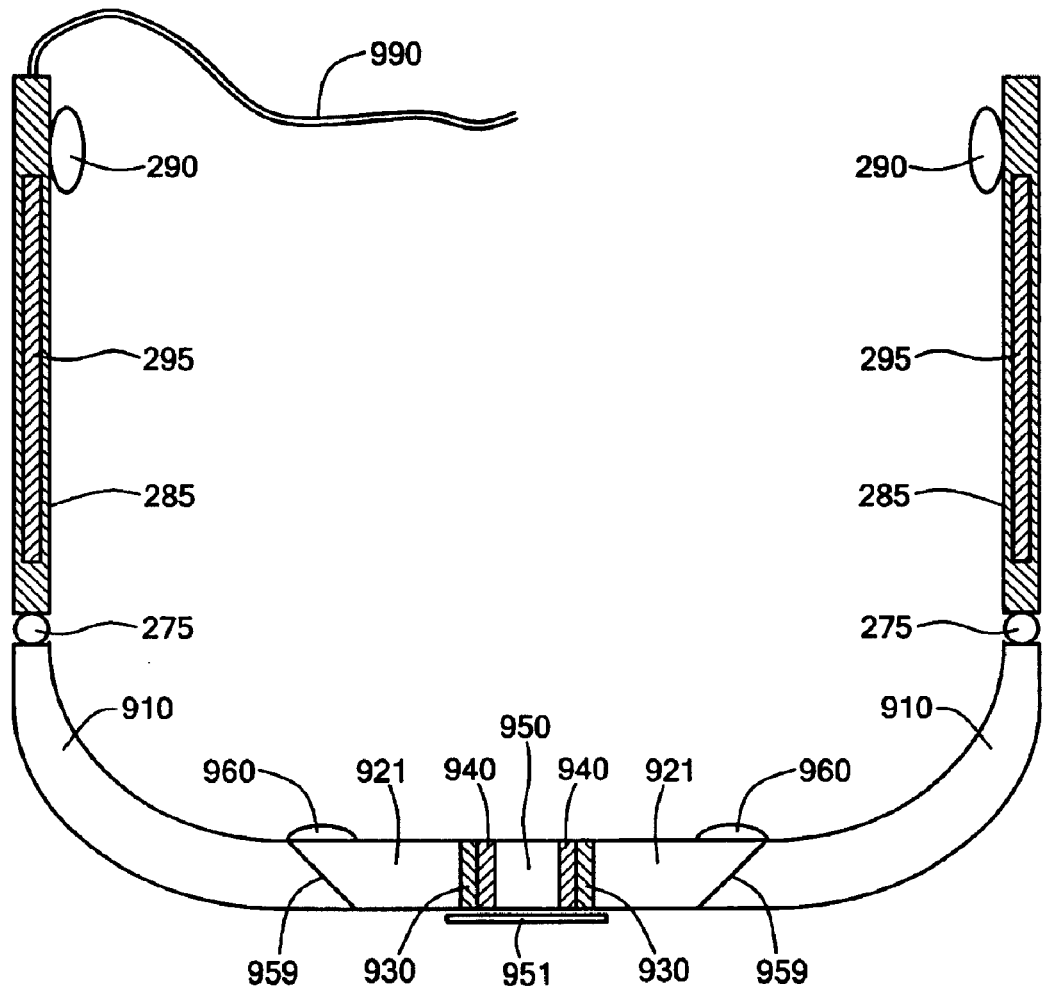
FIG. 31 is a schematic illustration of an embodiment of a complete binocular viewing system according to the invention.

FIG. 31 illustrates a complete binocular viewing system that may be used for many applications, including entertainment (viewing games, television, DVD, MP4 and the like), for industrial application such as viewing stereo microscope images, computer images, stereo images from CAD or other systems and the like, for medical applications such as viewing images from endoscopes, and for many other applications. The use of the transparent pipe 910 allows the user to have a high degree of awareness of the surroundings. Note that FIG. 31 also shows face curvature 929 to conform to the face. The curves introduced may take into account the user's natural eye rotation, as is known in the art of eyewear, so that the curvature may introduce a minimal amount of aberration in the users vision. Pipe 910 may be hollow to reduce weight.

In the embodiment of FIG. 31, pipe 921 is employed to move the displays away from the eyes, toward the nose, and shroud 951 is used to hide the displays and backlights. The shroud 951, which can wrap around all external surfaces of the bridge 950, also prevents room light from entering the display system at the bridge, and prevents stray light from the backlights from exiting the system and becoming visible to others.

The optical system employed in FIG. 31 is as described previously (FIG. 30). Additionally, FIG. 31 shows the use of hinges 275 to allow the temples to fold. This is accomplished by wrapping the flexible interconnects (previously described, but not shown here for clarity) so that the circuits fold in the vertical plane. The temples 285 may be hollow and may contain circuitry 295 for processing audio and video signals supplied by cable 990. Alternatively, these circuits may be in RF or other wireless communication with a signal source, and the circuits 295 may include the batteries needed to power the device. Transducers 290 are provided for audio. The transducers 290 may be simple speakers, or may also have noise cancellation or other improvements employing microphones. Microphones for speech recognition commands or communication may be incorporated in the design as has been described in previous patents by us.

Figure 32:
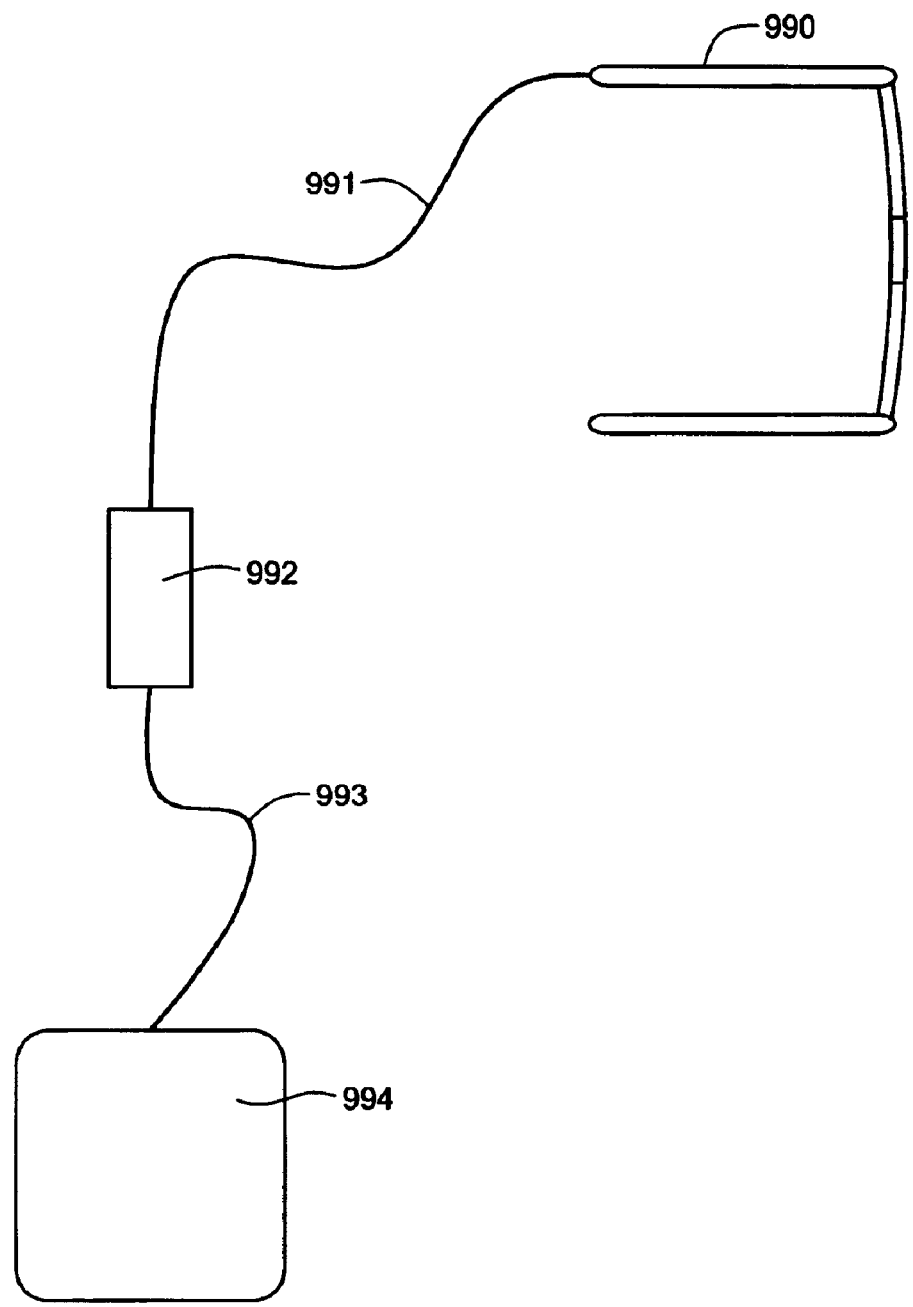
FIG. 32 is a schematic illustration of a viewing system incorporating a binocular viewing system of the present invention.
Figure 33:
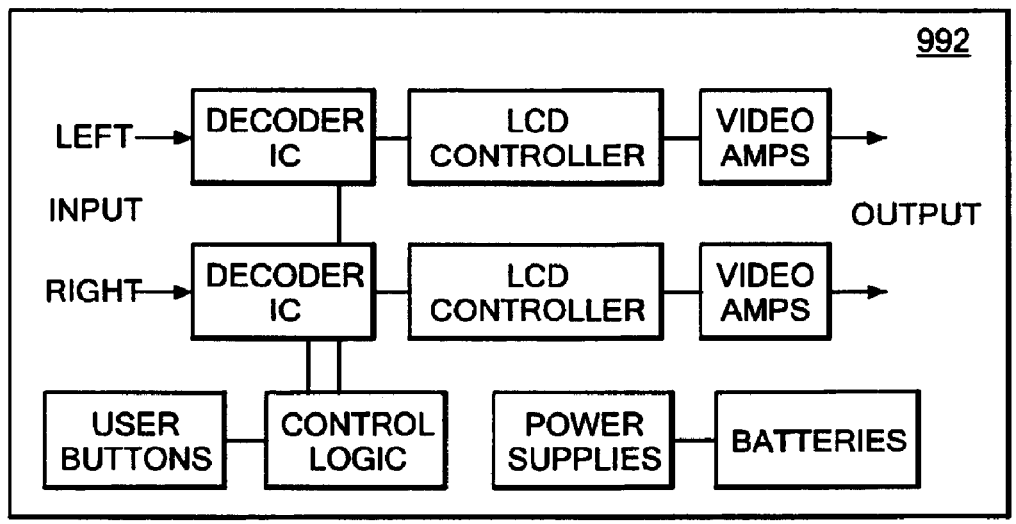
FIG. 33 is a block diagram of the interface controller of FIG. 32.

FIGS. 32 and 33 illustrate a system for viewing images. The binocular viewing system 990 is in communication with a source of image data 994 through cables 991 and 993 and interface controller 992. The image source 994 may for example comprise a television, digital video disc (DVD) player, MPEG4 player, camcorder, digital camera, video tape player or other source of video images. A video signal is generated by image source 994, which may provide the video signal in standard forms such as composite video (NTSC or PAL), component video, or other standardized form through an output connector. Alternatively, image source 994 may provide an output signal in any other format. Image source 994 may also comprise a personal computer, personal digital assistant, cellular telephone, or other portable electronic device capable of providing a computer or other image. The image signal is conveyed by cable 993 to the controller 992, which may provide the user with controls for adjusting the brightness, contrast or other aspects of the image. The controller may also provide space for incorporation of batteries. The interface controller may also incorporate a circuit for modifying the image signal so that the information is reformatted in a form best suited for driving the LCDs. This modified signal may be provided through cable 991 to the binocular viewing system. Cable 991 may also provide a serial data line for sending control instructions to circuits 295 (see FIG. 31) mounted in the temples. The cables 991, 993 may be provided with connectors.

In an alternative embodiment, the interface circuits may be entirely placed in the image source 994 or in the temples (285 in FIG. 31). Any combination of placements between the image source, interface controller, or temples may be used, and in some embodiments in which all the circuitry and batteries are all relocated, interface controller 992 will be unnecessary.

The cables 991, 993 may also be eliminated by replacing them with RF or IR methods of transmitting the signal to the binocular viewer 990, as is described in U.S. Pat. No. 6,091,546.

It will be appreciated that some aspects of the present invention can be employed in a monocular system, in which a display assembly is provided for only one eye. The invention is not to be limited by what has been particularly shown and described, except as indicated by the appended claims.

What is claimed is:

1. A binocular viewing system comprising:
    a nose bridging element arranged over the user's nose; and
    a right eye display assembly and a left eye display assembly, each comprising:
        an electronic display element operative to provide an image, and
        an optical pipe element comprising a transparent pipe and an eyepiece assembly, the transparent pipe arranged to relay light internally from the electronic display element to the eyepiece assembly; and
    an interpupillary adjustment mechanism configured to movably mount the right eye display assembly and the left eye display assembly to the nose bridging element to adjust a spacing between the eyepiece assembly of the right eye display assembly and the eyepiece assembly of the left eye display assembly, whereby an interpupillary distance between the user's eyes can be accommodated.

2. The binocular viewing system of claim 1, wherein the nose bridging element comprises a rail element, and the interpupillary adjustment mechanism comprises a sliding member disposed on each optical pipe element and configured to slide along the rail element.

3. The binocular viewing system of claim 2, wherein the rail element includes an elongated recess therein, and the sliding members are retained within the recess for sliding movement along the recess.

4. The binocular viewing system of claim 3, wherein the sliding members include an elongated dovetail projection and the elongated recess has a mating configuration to receive the dovetail projection.

5. The binocular viewing system of claim 2, further comprising a biasing mechanism disposed between the sliding member and the rail element.

6. The binocular viewing system of claim 5, wherein the biasing mechanism comprising a compression spring mechanism.

7. The binocular viewing system of claim 1, wherein the interpupillary adjustment mechanism is fixed to the optical pipe elements.

8. The binocular viewing system of claim 1, wherein the interpupillary adjustment mechanism is integral with the optical pipe elements.

9. The binocular viewing system of claim 1, wherein the interpupillary adjustment mechanism and the optical pipe elements comprise a single injection molding.

10. The binocular viewing system of claim 1, wherein the interpupillary adjustment mechanism and the optical pipe elements comprise an optical plastic material.

11. The binocular viewing system of claim 1, wherein the optical pipe elements are mounted so that optical axes of each of the eyepiece assemblies are arranged to provide a stereo image to the user.

12. The binocular viewing system of claim 1, wherein the interpupillary adjustment mechanism is arranged to move the optical pipe elements in a direction perpendicular to the user's line of sight when gazing at a distant object.

13. The binocular viewing system of claim 1, wherein the nose bridging element is disposed within a housing.

14. The binocular viewing system of claim 1, further comprising temple pieces attached to the right eye and left eye display assemblies.

15. The binocular viewing system of claim 14, further comprising audio transducers attached to the temple pieces.

16. The binocular viewing system of claim 14, further comprising a microphone attached to at least one of the temple pieces.

17. The binocular viewing system of claim 1, further comprising a pair of nose pieces attached to the nose bridging element.

18. The binocular viewing system of claim 1, further comprising a frame and lenses mounted to the nose bridging element between the right eye and left eye display assemblies and the user's eyes.

19. The binocular viewing system of claim 18 wherein the lenses comprise corrective lenses for the user's vision.

20. The binocular viewing system of claim 18, wherein the frame includes a detachable lens retaining element configured to removably retain lenses therein.

21. The binocular viewing system of claim 1, wherein the right eye display assembly and the left eye display assembly each further include a focusing adjustment mechanism.

22. The binocular viewing system of claim 21, wherein the focusing adjustment mechanism comprises a mechanism configured to movably mount each of the electronic display elements with respect to each of the associated optical pipe elements.

23. The binocular viewing system of claim 21, wherein the focusing adjustment mechanism comprises a mounting fixture disposed to mount each electronic display element to an end of each of the associated optical pipe elements.

24. The binocular viewing system of claim 23, wherein each mounting fixture comprises a carrier mounted for linear motion within a housing, the electronic display element fixed within the carrier, a rotatable lead screw fixed to the carrier via a transmission element to convert rotation of the lead screw to linear motion of the carrier within the housing.

25. The binocular viewing system of claim 1, wherein the optical pipe elements include a cavity for retention of circuitry or wiring connecting the electronic display elements.

26. The binocular viewing system of claim 1, wherein the nose bridging element includes a cavity for retention of circuitry or wiring connecting the electronic display elements.

27. The binocular viewing system of claim 1, further comprising temple housings disposed at ends of the right eye and left eye display assemblies, cavities formed in the temple housings to hold the electronic display elements and service loops of circuitry or wiring.

28. The binocular viewing system of claim 1, wherein the transparent pipe of the optical pipe element further includes two optical surfaces arranged to permit passage of ambient light through the two optical surfaces toward the user's eye.

29. The binocular viewing system of claim 1, wherein the eyepiece assembly of each optical pipe element comprises a turning mirror and an eyelens arranged to direct light toward the eye.

30. The binocular viewing system of claim 1, wherein the eyepiece assembly of each optical pipe element comprises a polarization beam-splitter coating, a quarterwave plate, and a focusing mirror arranged so that polarized light from the display assembly passes the beam-splitter coating and the quarterwave plate and is reflected from the focusing mirror to pass in the opposite direction through the quarterwave plate and is reflected from the beam-splitter coating toward the eye.

31. The binocular viewing system of claim 1, wherein the right eye display assembly and left eye display assembly are arranged in a curved configuration to accommodate curvature of a user's face.

32. A binocular viewing system for accommodating a range of interpupillary distances, comprising:
a right eye display assembly and a left eye display assembly connected by a nose bridging element, each display assembly comprising:
an electronic display element operative to provide an image, and
an eyepiece assembly comprising an optical pipe element and a surface arranged to relay light from the electronic display element toward an eye of a user;
wherein the right eye display assembly and the left eye display assembly are disposed with respect to each other to converge rays from each eye of the user on a virtual image provided at a distance less than optical infinity.

33. The binocular viewing system of claim 32, wherein each of the electronic display elements of the right eye and left eye display assemblies is displaced laterally from its optical axis, thereby providing left and right virtual images at a convergence distance less than infinity.

34. The binocular viewing system of claim 32, wherein each of the electronic display elements is movably mounted by the binocular viewing system.

35. The binocular viewing system of claim 32, wherein each of the eyepiece assemblies is movably mounted by the binocular viewing system.

36. The binocular viewing system of claim 32, wherein each eyepiece assembly includes an eyelens selected to minimize off-axis aberrations.

37. The binocular viewing system of claim 36, wherein the eyelens includes an aspherical lens.

38. The binocular viewing system of claim 36, wherein the diameter of the eyelens is selected to accommodate a range of interpupillary distances.

39. The binocular viewing system of claim 32, further comprising a focal adjustment mechanism.

40. The binocular viewing system of claim 32, wherein the right eye and left eye display assemblies are adjustably mounted with respect to each other to adjust a distance between the user's eyes and the right eye and left eye display assemblies.

41. The binocular viewing system of claim 32, wherein the right eye display assembly and the left eye display assembly are connected by a pivoting connection at the nose bridging element, the pivoting connection operative to adjust the angular orientation of the optical axis of each of the display assemblies with respect to the user's eyes.

42. The binocular viewing system of claim 32, wherein the surfaces of each eyepiece assembly are arranged with respect to each other to converge rays from each eye of the user on a virtual image provided at a distance less than optical infinity.

43. The binocular viewing system of claim 32, wherein the nose bridging element comprises an optical pipe element connecting the right eye display assembly and the left eye display assembly.

44. The binocular viewing system of claim 32, wherein each eyepiece assembly is suspended from a support, the electronic display element affixed directly to the eyepiece assembly at the support.

45. The binocular viewing system of claim 44, further comprising circuitry or wiring in communication with the electronic display element disposed on the support.

46. The binocular viewing system of claim 32, wherein the right eye display assembly and the left eye display assembly each include an optical pipe element disposed to transmit light from the electronic display element to the eyepiece assembly.

47. The binocular viewing system of claim 32, wherein the nose bridging element comprises an optical pipe aligned with the optical pipes of the right eye display assembly and the left eye display assembly.

48. The binocular viewing system of claim 47, wherein the optical pipes of the right eye display assembly and the left eye display assembly are carved to accommodate curvature of a user's face.

49. The binocular viewing system of claim 32, wherein the right eye and left eye display assemblies are mounted on a frame configured to be supported by a user's head.

50. A binocular viewing system comprising:
an optical pipe element having a curvature to accommodate curvature of a user's face, a mid portion of the optical pipe element forming a nose bridging element;
a right eye display assembly and a left eye display assembly, each display assembly comprising:
an electronic display element operative to provide an image disposed to transmit light into an end of the optical pipe element,
a portion of the optical pipe element disposed to receive light from the electronic display element, and
an eyepiece assembly comprising an eyelens and at least one reflective surface, the reflective surface disposed within the optical pipe element to relay light in the portion of the optical pipe element toward an eye of the user.

51. The binocular viewing system of claim 50, wherein the optical pipe element is solid and transparent.

52. The binocular viewing system of claim 50, wherein the optical pipe element is hollow.

53. The binocular viewing system of claim 50, wherein each display assembly further includes an optical wedge provided between the eye lens and the optical pipe element on an optical path from the reflective surface to the eyelens, the optical wedge configured to provide an axial optical system from the electronic display element to the eye lens.

54. The binocular viewing system of claim 50, wherein the eye lens of each display assembly is located at a temple end of the optical pipe element.

55. The binocular viewing system of claim 50, wherein the electronic display element is spaced from the eye lens by a distance approximately equal to a focal length of the eye lens.

56. The binocular viewing system of claim 50, each display assembly further comprises an optical wedge on an external surface of the optical pipe element on an optical path from the reflective surface to the eye, the optical wedge configured to provide an axial optical system between the electronic display element and the eye.

57. The binocular viewing system of claim 56, wherein the optical wedges of each display assembly are integrally connected to extend across a portion of the optical pipe element.

58. The binocular viewing system of claim 50, wherein each eyepiece assembly comprises a plurality of reflective surfaces disposed within the optical pipe element to relay light in the portion of the optical pipe element toward an eye of the user, whereby a wide field of view is provided.

59. The binocular viewing system of claim 50, wherein the optical pipe element, the right eye display assembly, and the left eye display assembly art attached to temple pieces configured to be supported by a user's head.

60. A binocular viewing system comprising:
an optical pipe element, a mid portion of the optical pipe element forming a nose bridging element; and
a right eye display assembly and a left eye display assembly, each display assembly comprising:
an electronic display element operative to provide an image, the electronic display element disposed within a portion of the optical pipe element, circuitry or wiring connected to the electronic display element passing along an upper or lower surface or in a cavity of the optical pipe element, and
an eyepiece assembly comprising an eyelens and at least one at least partially reflective surface, the reflective surface disposed within the optical pipe element to relay light from the electronic display element toward an eye of the user.

61. The binocular viewing system of a claim 60, wherein the at least partially reflective surface comprises a mirror.

62. The binocular viewing system of claim 60, wherein the at least partially reflective surface comprises a polarization beam splitter disposed to transmit illumination from an illumination source along the optical pipe element to the electronic display element, the electronic display element being reflective to return light to the surface, the surface operative to reflect light to the eyelens.

63. The binocular viewing system of claim 60, further comprising an illumination source for the electronic display element disposed to provide illumination from an end of the optical pipe element.

64. The binocular viewing system of claim 63, further comprising a collimating lens disposed within or on an end surface of the optical pipe element to collimate light from the illumination source to the electronic display element.

65. The binocular viewing system of claim 60, further comprising an illumination source for the electronic display element disposed adjacent to the electronic display element.

66. The binocular viewing system of claim 60, wherein the eyelens minimizes aberrations.

67. The binocular viewing system of claim 60, wherein the optical pipe element is formed of polymethylmethacrylate, polycarbonate resin, epoxy resin, urethane, cyclo-olefin, or glass.

68. The binocular viewing system if claim 60, wherein the optical pipe element, the right eye display assembly, and the left eye display assembly are attached to temple pieces configured to by supported by a user's head.

69. The binocular viewing system of claim 60, wherein the electronic display element of each display assembly is disposed with the nose bridging element of the optical pipe element.

70. The binocular viewing system of claim 69, further comprising an illumination source for the electronic display element disposed within the nose bridging element of the optical pipe element.

71. The binocular viewing system of claims 1, 32, 50 or 60, wherein the electronic display elements are in communication with a source of image data.

72. The binocular viewing system of claim 71, wherein the source of image data comprises a television, a digital video disc player, an MPEG4 player, a camcorder, a digital camera, a video tape player, a personal computer, a personal digital assistant, or a cellular telephone.

73. The binocular viewing system of claim 32, 50, or 60, further comprising a frame and lenses mounted to the nose bridging element between the right eye and left eye display assemblies and the user's eyes.

74. The binocular viewing system of claim 73 wherein the lenses comprise corrective lenses for the user's vision.

75. The binocular viewing system of claim 73, wherein the frame includes a detachable lens retaining element configured to removably retain lenses therein.

* * * * *

UNITED STATES PATENT AND TRADEMARK OFFICE
CERTIFICATE OF CORRECTION

PATENT NO.         : 6,879,443 B2
APPLICATION NO. : 10/656905
DATED                  : April 12, 2005
INVENTOR(S)       : Mark B. Spitzer et al.

It is certified that error appears in the above-identified patent and that said Letters Patent is hereby corrected as shown below:

Column 3, line 15, "incorporation" should read --incorporating--;

Column 8, line 25, "angle ?" should read --angle $\gamma$--;

Column 8, line 40, "angle ?" should read --angle $\gamma$--;

Column 16, claim 59, line 31, "art" should read --are--; and

Column 17, claim 68, line 7, "if" should read --of--.

Signed and Sealed this

Nineteenth Day of December, 2006

JON W. DUDAS
*Director of the United States Patent and Trademark Office*